(12) United States Patent
Michael et al.

(10) Patent No.: US 7,857,366 B2
(45) Date of Patent: Dec. 28, 2010

(54) REMOVABLE RESILIENT VEHICLE PROTECTION ASSEMBLY

(76) Inventors: Kenneth Michael, 1560 Nipissing Court, Pickering, ON (CA) L1V 6T9; Vernon Michael, 18 Parklane, Bayshore Village, RR#3, Brechin, ON (CA) L0K 1B0

( * ) Notice: Subject to any disclaimer, the term of this patent is extended or adjusted under 35 U.S.C. 154(b) by 150 days.

(21) Appl. No.: 12/239,081

(22) Filed: Sep. 26, 2008

(65) Prior Publication Data

US 2009/0108575 A1    Apr. 30, 2009

(51) Int. Cl.
*B60R 19/42* (2006.01)
(52) U.S. Cl. .................. 293/126; 293/128; 293/142
(58) Field of Classification Search .............. 293/126, 293/128, 142
See application file for complete search history.

(56) References Cited

U.S. PATENT DOCUMENTS

| | | |
|---|---|---|
| 3,582,134 A | 6/1971 | Shaff |
| 3,596,962 A | 8/1971 | Hertzell |
| 3,610,669 A | 10/1971 | Morrissey, Sr. |
| 3,667,163 A | 6/1972 | Bjorum et al. |
| 4,010,297 A | 3/1977 | Wenrick |
| 4,217,715 A | 8/1980 | Bryan, Jr. |
| 4,260,655 A | 4/1981 | Zoller |
| 4,296,155 A | 10/1981 | Madonia et al. |
| 4,372,083 A | 2/1983 | Hatzikelis et al. |
| 4,446,179 A | 5/1984 | Waugh |
| 4,570,383 A | 2/1986 | Adell |
| 4,643,471 A | 2/1987 | Fishback |
| 4,648,644 A | 3/1987 | Swanson et al. |
| 4,674,783 A | 6/1987 | Hogan, III |
| 4,707,008 A | 11/1987 | Falco |
| 4,707,009 A | 11/1987 | Barnett |
| 4,708,380 A | 11/1987 | Cruz |
| 4,726,614 A | 2/1988 | Myers et al. |
| 4,773,184 A | 9/1988 | Adell |
| 4,796,935 A | 1/1989 | Maraia |
| 4,810,013 A | 3/1989 | Spears |
| 4,810,015 A | 3/1989 | McNeil |
| 4,828,302 A | 5/1989 | Marasigan, Jr. |
| 4,828,303 A | 5/1989 | Soria |
| 4,839,991 A | 6/1989 | Rathgeb |
| 4,871,205 A | 10/1989 | Bray |
| 4,879,543 A | 11/1989 | Smith, Sr. |
| 4,896,911 A | 1/1990 | Duke |
| 4,969,674 A | 11/1990 | Wagner |
| 4,974,892 A | 12/1990 | Huard |

(Continued)

*Primary Examiner*—Joseph D Pape
(74) *Attorney, Agent, or Firm*—Bereskin & Parr LLP; Isis E. Caulder

(57) ABSTRACT

A removable vehicle protection assembly for installation between first and second edges of a vehicle includes a resilient strip, a first resilient clamping member with a first clamp hook element, and a second hook element. The resilient strip is extendible along its longitudinal axis and is designed to protect the surface of the vehicle. The first resilient clamping member is used to protect a portion of the first vehicle edge and for securely receiving one end of the resilient strip portion. The resilient strip has a first clamp hook element for engaging a portion of the first vehicle edge and a second hook element coupled to the other end of the resilient strip for engaging a portion of the second vehicle edge. When installed on a vehicle, vehicle protection assembly protects the surface of a vehicle from damage when said vehicle is in transit, parked, or being towed.

15 Claims, 28 Drawing Sheets

U.S. PATENT DOCUMENTS

| | | |
|---|---|---|
| 4,998,380 A | 3/1991 | Adell |
| 5,071,181 A | 12/1991 | Wagner |
| 5,267,763 A | 12/1993 | Klein |
| 5,518,283 A | 5/1996 | Egelske |
| 5,638,584 A * | 6/1997 | De Anfrasio ............. 24/265 H |
| 5,893,226 A * | 4/1999 | Sophocleous et al. ......... 40/591 |
| 6,254,170 B1 | 7/2001 | Farmer et al. |
| 6,736,435 B1 * | 5/2004 | Ditthavong ................. 293/128 |
| 7,073,830 B1 | 7/2006 | Chen et al. |
| 7,168,208 B2 | 1/2007 | Ward |
| 2002/0108314 A1 | 8/2002 | Mantegazza |

* cited by examiner

REMOVABLE RESILIENT VEHICLE PROTECTION ASSEMBLY

The present invention claims the benefit of the filing priority of Canadian Patent Application No. 2,600,626 filed Sep. 26, 2007.

FIELD

The embodiments described herein relate to vehicle protection devices and in particular to a removable resilient vehicle protection assembly.

INTRODUCTION

The prior art discloses various kinds of removable strips to protect the exterior body of a vehicle. For example, U.S. Pat. No. 4,828,302 discloses a removable resilient strip with hooks directly attached to a resilient protection member. These hooks attach to the edges of a movable vehicle component, such as a car door.

Such prior art devices focus on protecting the surface of a vehicle component, while providing relatively minimal protection to the edges of the vehicle component upon which the protection assembly is placed. Other prior art devices such as that disclosed in U.S. Pat. No. 4,879,543 protect the surface of a vehicle component when oriented in a first horizontal position. However, in order to appreciably protect an edge of the vehicle component, the protective strip must be removed and placed in a second vertical position.

SUMMARY

The embodiments described herein provide in one aspect, a removable vehicle protection assembly for installation between a first and second edges of a vehicle, said removable vehicle protection assembly comprising:

(a) a resilient strip portion extendible along a longitudinal axis for protecting the surface of the vehicle;

(b) a first resilient clamping member for protecting a portion of the first vehicle edge and for securely receiving one end of the resilient strip portion and having a first clamp hook element for engaging a portion of the first vehicle edge; and (c) a second hook element coupled to the other end of the resilient strip portion, said second hook element for engaging a portion of the second vehicle edge.

Further aspects and advantages of the embodiments described herein will appear from the following description taken together with the accompanying drawings.

DRAWINGS

For a better understanding of the embodiments described herein and to show more clearly how they may be carried into effect, reference will now be made, by way of example only, to the accompanying drawings which show at least one exemplary embodiment, and in which.

Figure 1:
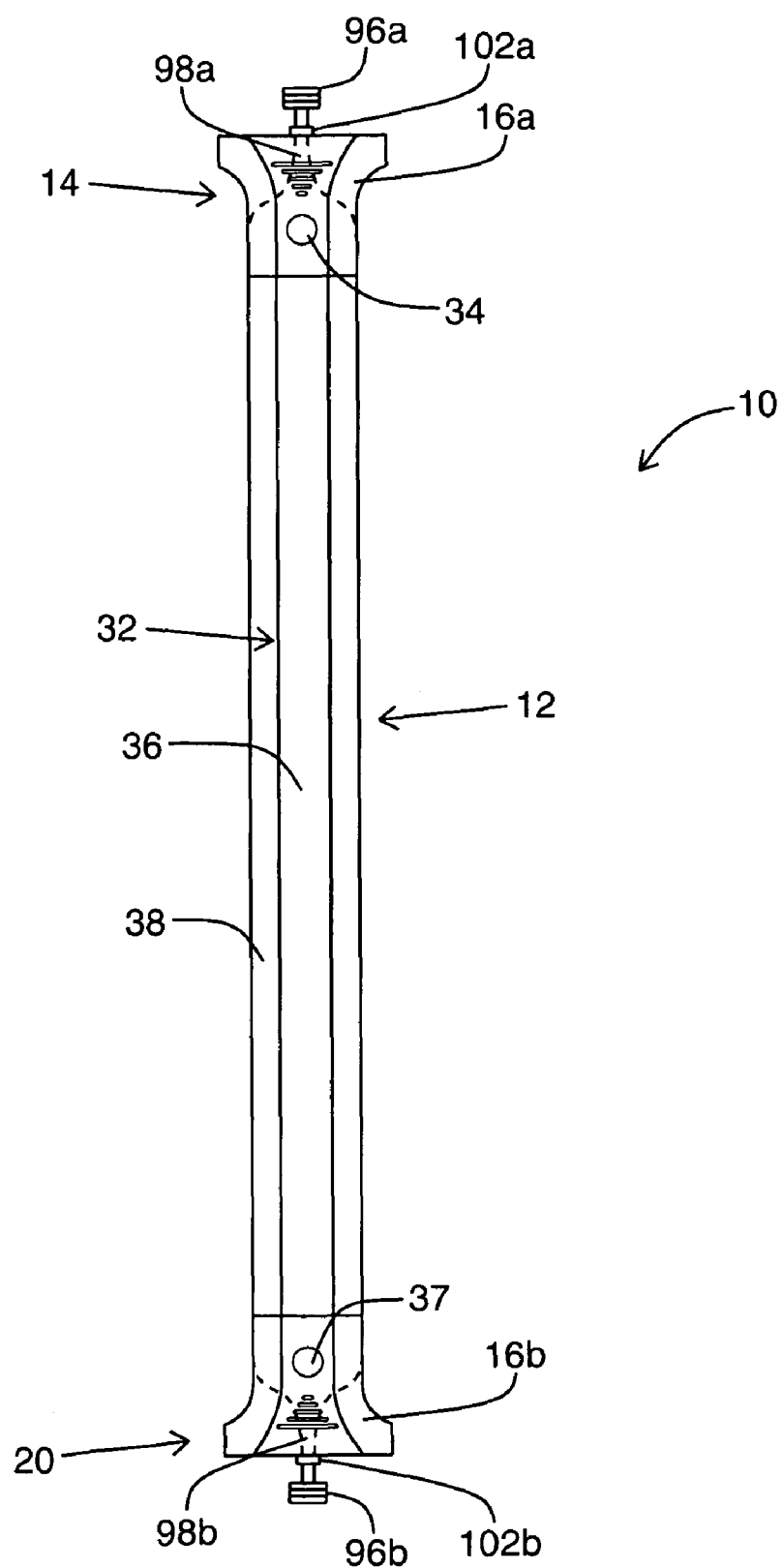
FIG. 1 is a front view of an exemplary vehicle protection assembly.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Figure 2:
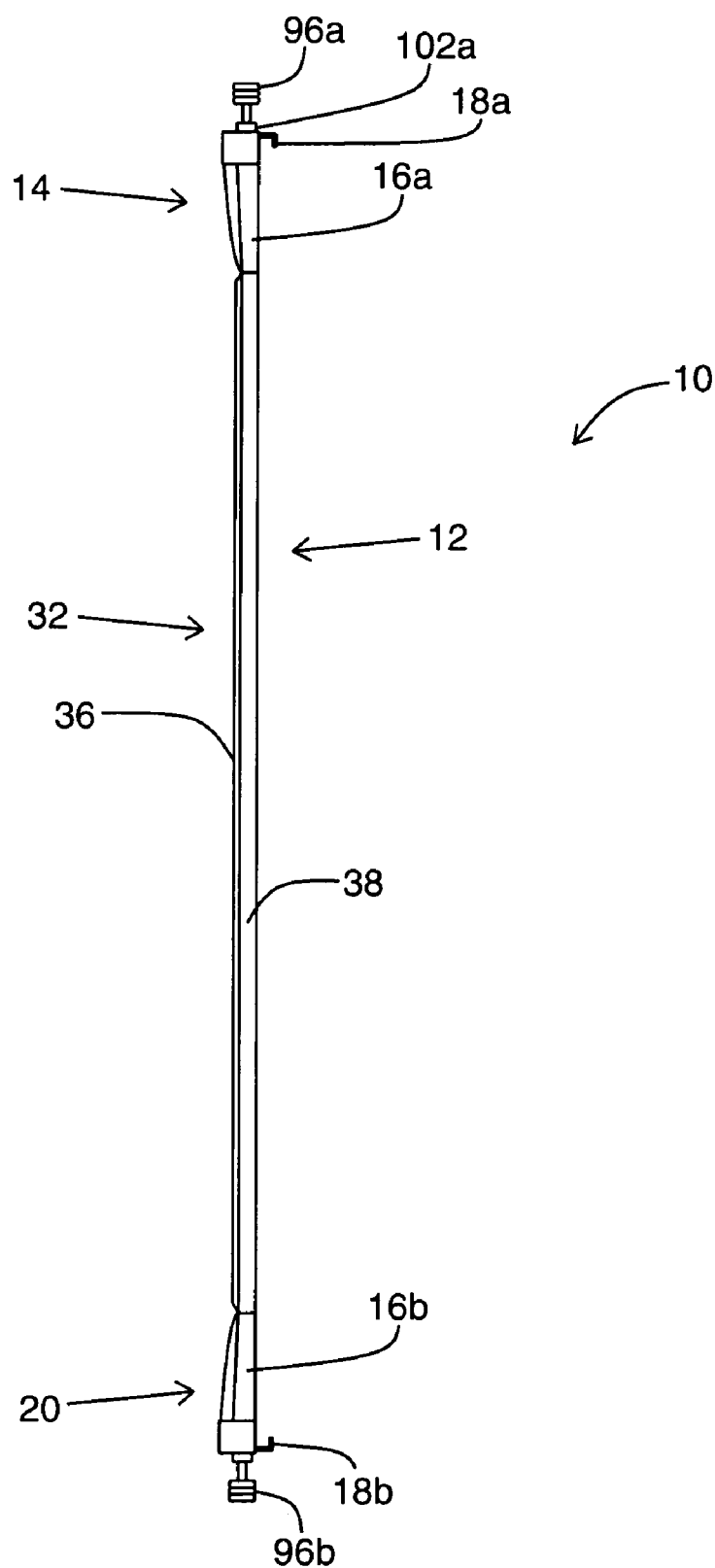
FIG. 2 is a side view of the vehicle protection assembly of FIG. 1.
Figure 3:
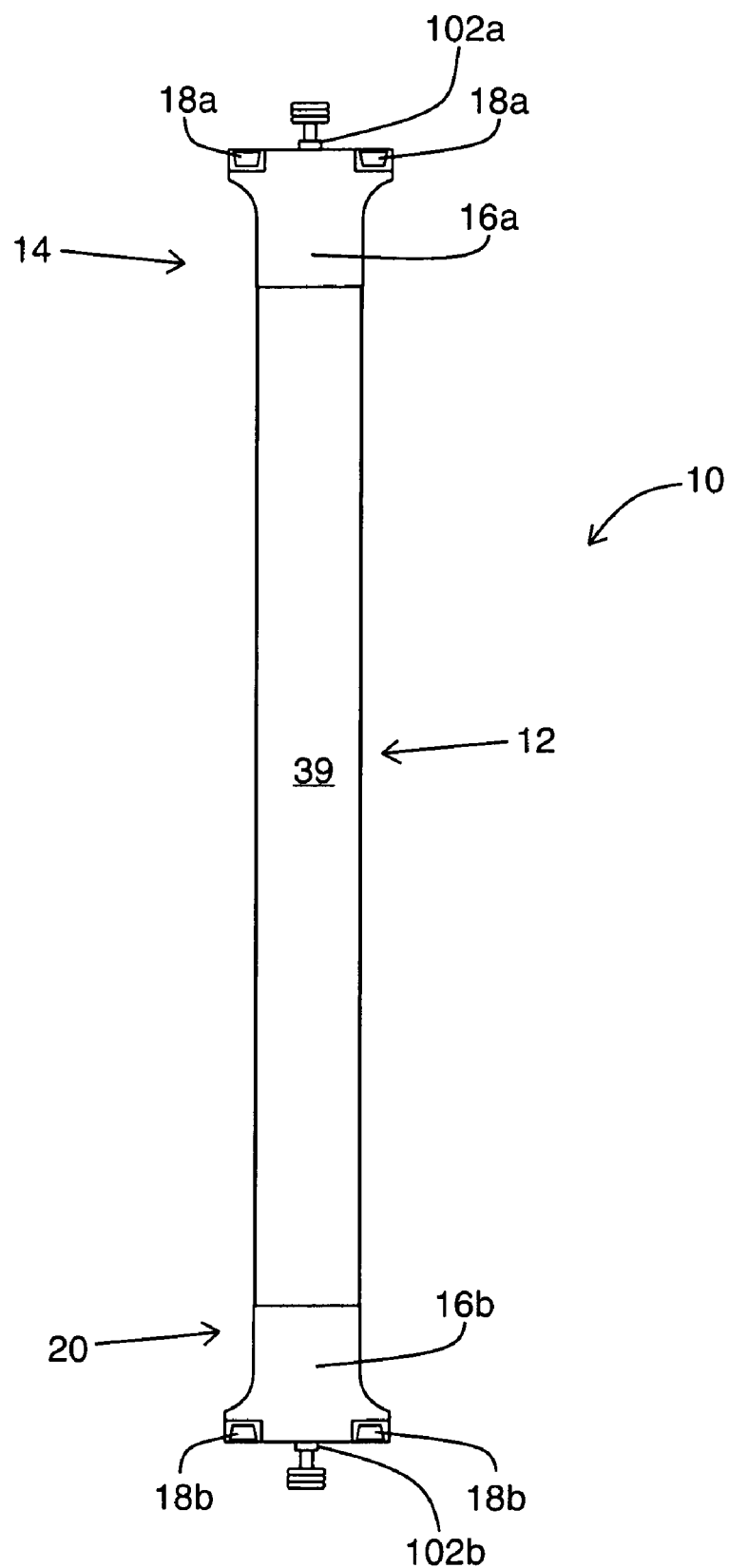
FIG. 3 is a rear view of the vehicle protection assembly of FIG. 1.

FIGS. 1, 2 and 3 illustrate front, side and bottom views of an example vehicle protection assembly 10. A first end 14 of the resilient strip 12 is engaged with resilient clamping member 16a, and second end 20 of resilient strip 12 is engaged with resilient clamping member 16b. As shown in FIG. 1, the portion of resilient strip 12 engaged within resilient clamping members 16a and 16b is indicated by a dashed line. When installed on a vehicle, vehicle protection assembly 10 is designed to protect the surface of a vehicle from damage when said vehicle is in transit, parked, or being towed.

Resilient clamping member 16a is fixedly coupled to a clamp hook element 18a and resilient clamping member 16b is fixedly coupled to a clamp hook element 18b. Preferably the clamp hook elements 18a and 18b are integrally formed with the resilient clamping members 16a and 16b, respectively in a common housing. First and second clamp hook elements 18a and 18b are designed to removably engage an edge of a vehicle as will be further discussed in detail. First and second clamp hook elements 18a and 18b can be used to install vehicle protection assembly 10 across two vehicle edges (i.e. on the surface of a door, trunk or hood of a vehicle) as will be further discussed. The clamp hook elements 18a and 18b can be implemented as a single hook or as a plurality of hooks and can be rubberized bonded, or coated with rubber, so as not to scratch or otherwise damage the vehicle edge to which it is attached.

In another example of vehicle protection assembly 10, second end 20 of resilient strip 12 uses a latching device instead of a resilient clamping member 16 to engage vehicle protection assembly 10 with a vehicle edge. The latching device is fixedly coupled to the second end 20 of resilient strip 12 in a conventional way. In one embodiment, the latching device is a hook that can engage with a vehicle edge where the hook is placed within a reinforced aperture in the resilient strip 12. However, it should be understood that the latching device can be any latching device that is known in the art.

Figure 4:
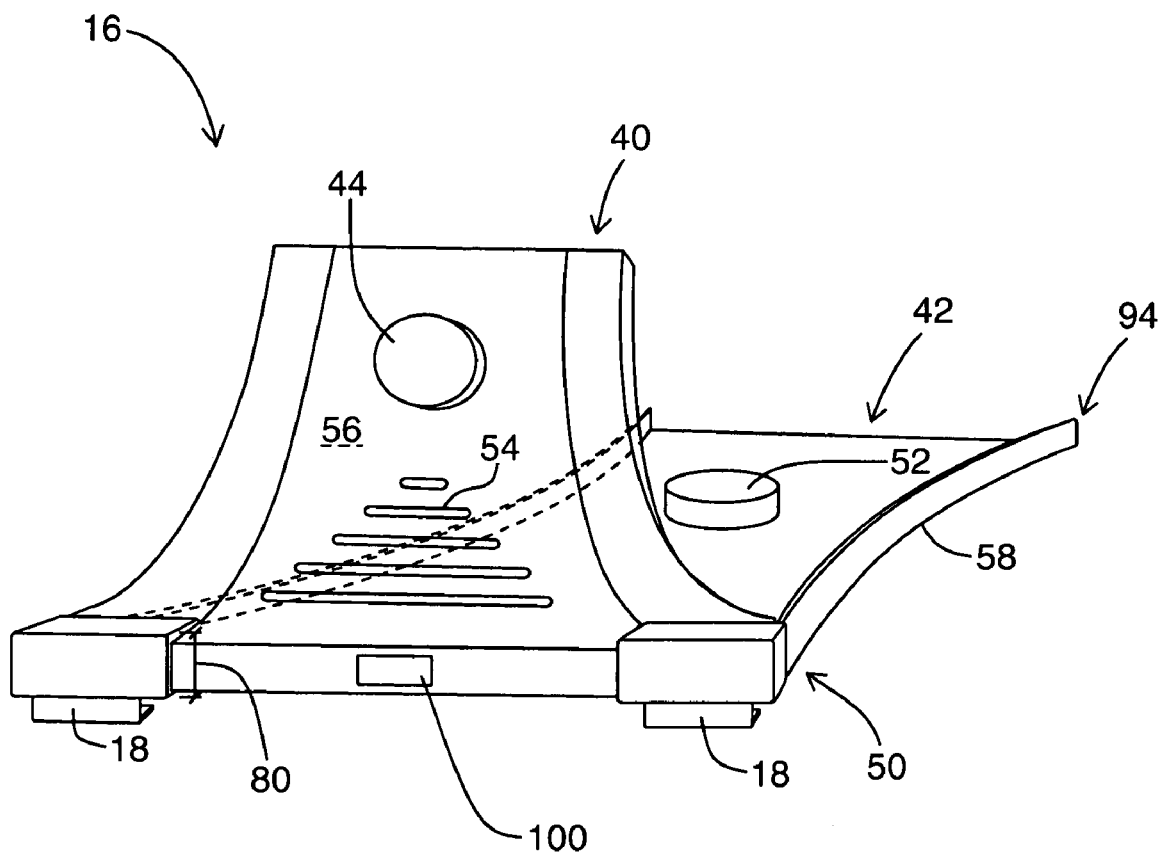
FIG. 4 is a side perspective view of the resilient clamping member of the vehicle protection assembly of FIG. 1.

FIG. 4 shows in more detail the resilient clamping member 16. As discussed above, resilient clamping member 16 includes a clamp hook element 18 that is preferably integrally formed with the resilient clamping members 16 in a common housing. However, clamp hook element 18 could be fixedly coupled to the resilient clamping member 16 in a variety of convention ways including strong industrial adhesive or some other conventional means. The clamp hook element 18 is designed to removably engage with the edge of a vehicle (e.g. door, trunk, hood, etc.). Therefore, resilient clamping member 16 can be used to removably couple one or both ends of the resilient strip 12 to an edge of a vehicle as will be discussed in further detail.

Figure 5:
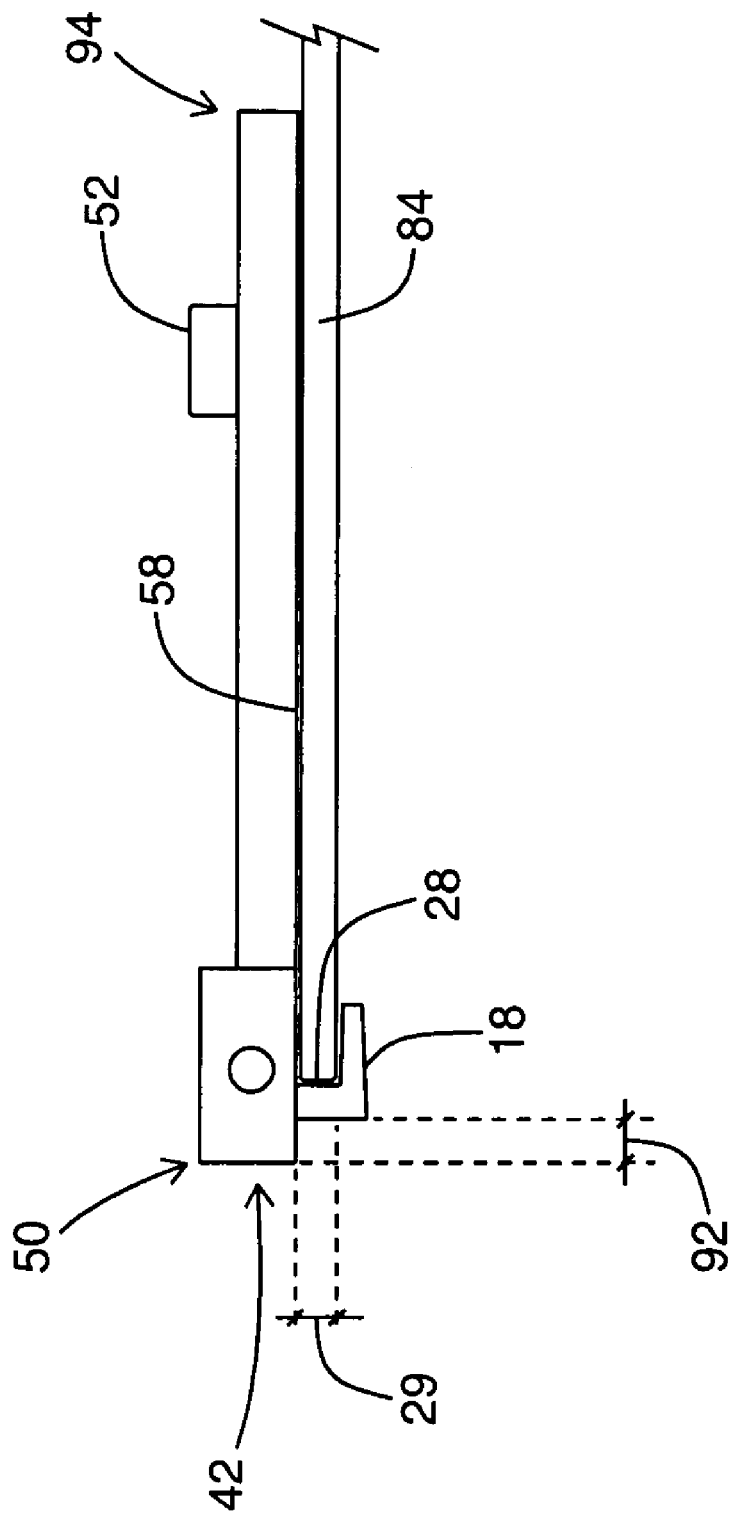
FIG. 5 is a side view of the lower clamp of the resilient clamping member of FIG. 4.

FIG. 5 shows a side view of lower clamp 42 of resilient clamping member 16. In this particular embodiment, clamp hook element 18 is fixedly connected to lower surface 58 of lower clamp 42. In this particular embodiment, when vehicle protection assembly 10 is attached to a vehicle, resilient clamping member 16 is removably attached to first vehicle edge 28. When vehicle protection assembly 10 is installed on a vehicle, clamp hook element 18 wraps around first vehicle edge 28. First vehicle edge 28 can be the edge of a vehicle door, trunk, hood, etc. In the embodiment of FIG. 5, clamp element 18 engages first vehicle edge 28 of vehicle door 84.

In one embodiment, the depth dimension 29 of the clamp hook element 18 substantially corresponds to the thickness of first vehicle edge 28. In this particular embodiment, clamp hook element 18 fits snuggly over first vehicle edge 28. In another embodiment, clamp hook element 18 can be appreciably larger than first vehicle edge 28, but is held in place due to the tensile forces created within resilient strip 12 when vehicle protection assembly 10 is extended for attachment. In one embodiment, clamp hook element 18 is made of metal and can be rubberized, bonded, or coated with rubber, so as not to scratch or otherwise damage first vehicle edge 28. Alternatively, clamp hook element 18 could be made of plastic.

Clamp hook element 18 is preferably recessed back from first end 50 of resilient member 16. This small recess gap is illustrated as recess offset 92. Due to recess offset 92, in the preferred embodiment, resilient clamping member 16 extends past first vehicle edge 28 when vehicle protection apparatus 10 is mounted on a vehicle. Since resilient clamping member 16 extends past first vehicle edge 28, the probability that a foreign object will contact and damage first vehicle edge 28 is substantially decreased. Foreign objects can include, but are not limited to: doors of other vehicles, airborne debris, structural elements of a parking garage, bicycle handles, poles, and garage doors. When the component of a vehicle (such as door 84 is brought near a foreign object), in most circumstances, the foreign object will contact the part of resilient clamping member 16 extending beyond first vehicle edge 28. Similarly, in most circumstances, when a foreign object is moved towards first vehicle edge 28, the foreign object will contact the part of resilient clamping member 16 extending beyond vehicle edge 28. Often, the foreign object will contact resilient clamping member 16, and not first vehicle edge 28. Since resilient member 16 is made of a resilient material, it will likely absorb a large portion of the impact force applied by the foreign object. The resilient member 16 will also likely undergo minimal permanent deformation, passing little (if any) force onto first vehicle edge 28. When the embodiment of FIG. 5 is applied to a vehicle, the portion of resilient clamping member 16 extending past first vehicle edge 28 will protect first vehicle edge 28 from dents, scratches or the like.

Figure 6:
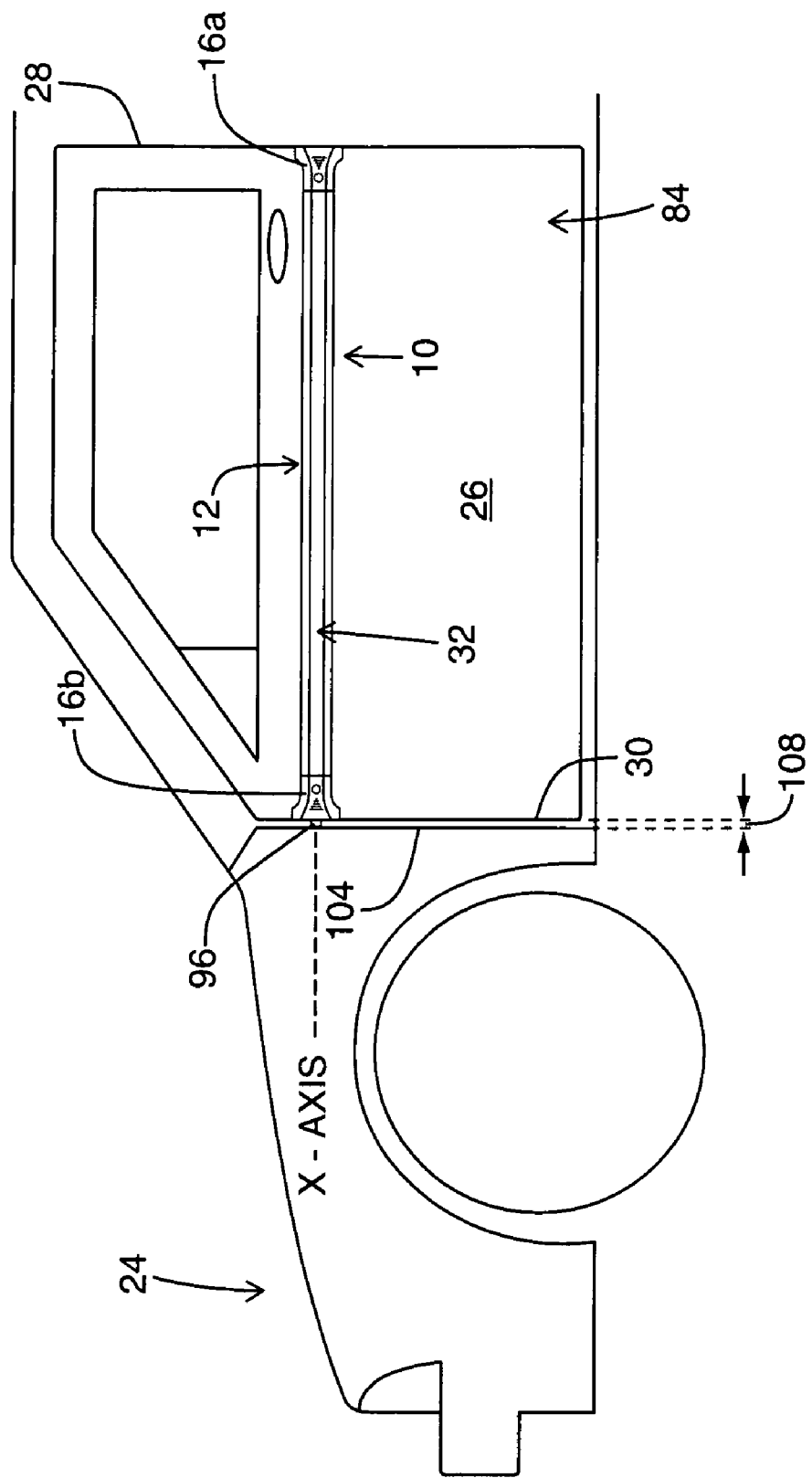
FIG. 6 is a side view of the vehicle protection assembly of FIG. 1 installed horizontally on the door of a vehicle.

FIG. 6 illustrates how the vehicle protection assembly 10 of FIG. 1 can be installed on door 84 of vehicle 24. Vehicle protection assembly 10 is positioned horizontally across vehicle surface 26. First clamp hook element 18a (not shown)

is hooked onto first vehicle edge 28 so that first resilient clamping member 16a is securely coupled to first vehicle edge 28. Resilient strip 12 is then stretched into an extended position by pulling and hooking the second clamp hook element 18b (not shown) onto second vehicle edge 30. Once this is done, first and second resilient clamping members 16a and 16b are both securely coupled to first and second vehicle edges 28 and 30, respectively, as shown. Due to the tensile forces created within resilient strip 12 (along the X-axis), vehicle protection assembly 10 can be securely held in place across vehicle surface 26.

As will be appreciated by those skilled in the art and as shown in FIG. 6, the resilient clamping member 16a of the vehicle protection assembly 10 of FIG. 1 protects a second vehicle edge 30 in a similar manner to first vehicle edge 28.

Figure 7:
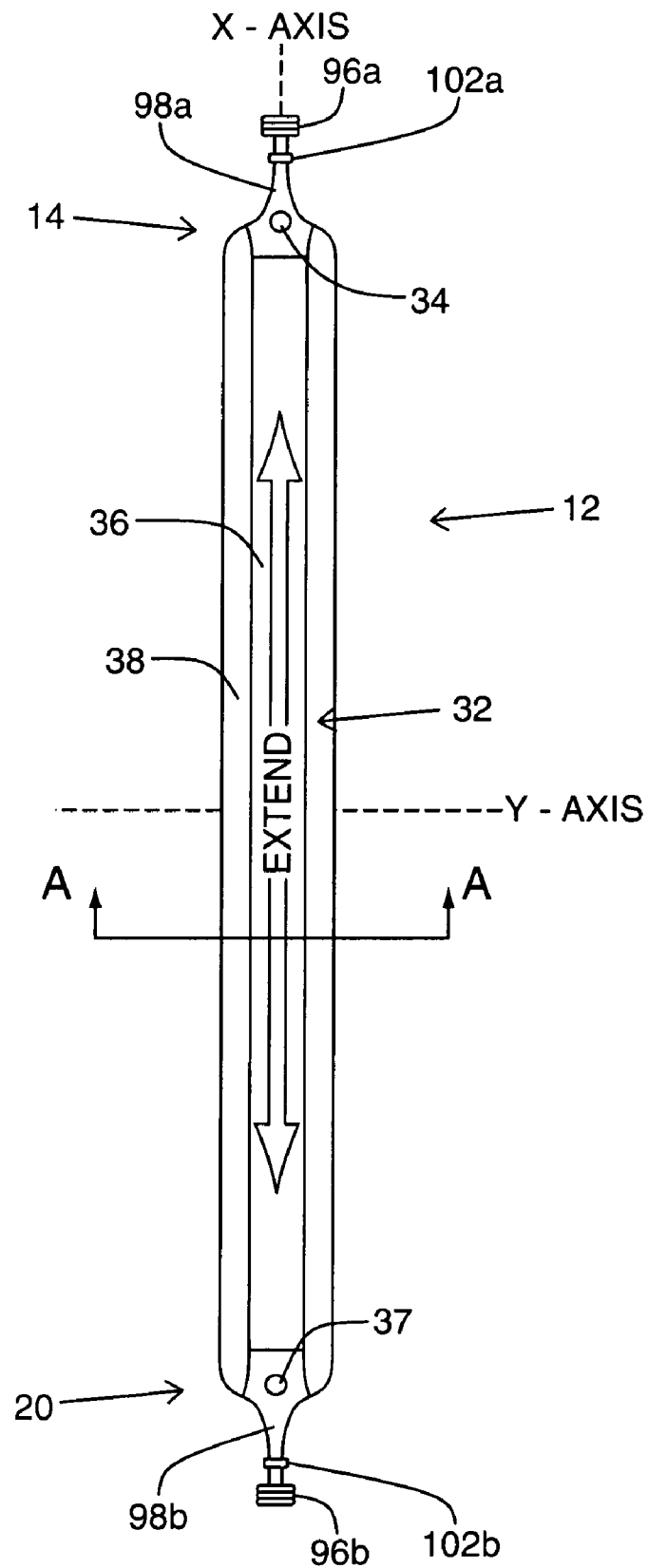
FIG. 7 is a front view of the resilient strip member of the vehicle protection assembly of FIG. 1.

Referring now to FIG. 7, resilient strip 12 will now be discussed in detail. Resilient strip 12 includes compression flange members 96a and 96b, stoppers 102a and 102b, transition portions 98a and 98b having first and second apertures 34 and 37, and a protection section 32 positioned in between.

Vehicle protection section 32 includes a base section 38 and a raised section 36. Raised section 36 is preferably narrower and shorter than base section 38. Raised section 36 can also extend outwardly in a direction away from vehicle-abutting surface 39 (see FIG. 7) such that raised section 36 extends outwardly to a greater extent than base section 38.

Resilient strip 12 can be made of a resilient material such as, but not limited to, rubber, silicone, flexible plastic, stretchable industrial strength fabric etc. Since resilient strip 12 is made of resilient material, it can be stretched along its elongate axis (X-axis) to an extended position. The dimensions of resilient strip 12 are such that its length along the X-axis is substantially longer than its length along the Y-axis. Such relative dimensions can facilitate elongation along the X-axis, and can occur simultaneously with minimal contraction in the direction of the Y-axis.

Resilient strip 12 has a non-extended length that is smaller than the distance between first vehicle edge 28 and second vehicle edge 30 on which it is to be installed. Accordingly, when its first clamp hook element 18a engages with first vehicle edge 28 and its second clamp hook element 18b engages with second vehicle edge 30, resilient strip 12 can be stretched or extended along its X-axis so that the tensile force created within resilient strip 12 will securely hold vehicle protection assembly 10 in place over vehicle surface 26 (see FIG. 6).

Vehicle protection assembly 10 can be disengaged from vehicle 24 by first extending resilient strip 12 along its X-axis such that the first and second clamp hook elements 18a and 18b can be disengaged from the vehicle edges 28 and 30.

In one embodiment, in its non-extended position, the portion of resilient strip 12 between first clamping member 16a and second clamping member 16b, has a length in the approximate range of 2 feet to 8 feet (see FIG. 1) The length of resilient strip 12 can vary depending on the vehicle component (e.g. door, trunk, hood, etc.) that the user is seeking to protect from damage. As discussed, preferably the length of resilient strip 12 is smaller than the distance between the first vehicle edge 28 and second vehicle edge 30 to which vehicle protection assembly 10 is to be connected.

In one embodiment, in its non-extended position, resilient strip 12 has a width, in the direction substantially orthogonal to the length dimension (i.e. the Y-axis), in the approximate range of 1 inch to 6 inches.

Figure 8:
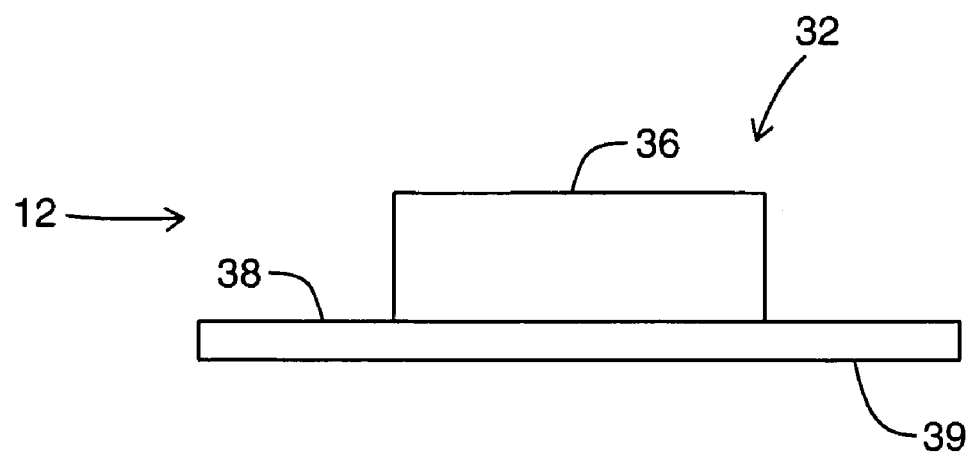
FIG. 8 is a sectional view of the resilient strip of FIG. 7, taken along line A-A of FIG. 7.
Figure 9:
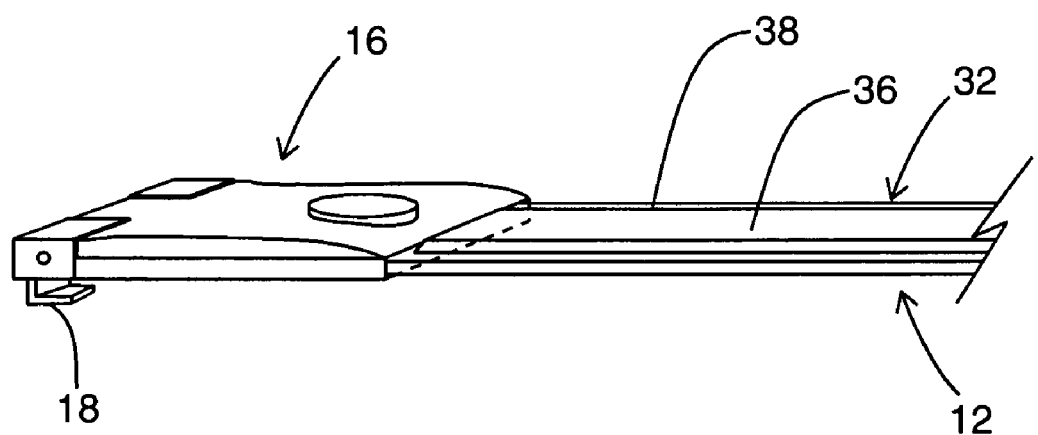
FIG. 9 is a partial side perspective view of the resilient strip of FIG. 7.

FIG. 8 illustrates a cross-sectional view of the resilient strip 12 of FIG. 7, taken along line A-A of FIG. 7. FIG. 9 illustrates a partial perspective view of the resilient strip 12 embodiment of FIG. 7. Raised section 36 can be separate and fixedly adhered to base section 38 using conventional adhering or bonding means. Alternatively, raised section 36 and base section 38 can be integrally formed. Preferably, both raised section 36 and base section 38 are made of a resilient material, such as, but not limited to, rubber, silicone, flexible plastic, or stretchable industrial strength fabric etc. Both raised section 36 and base section 38 can be capable of elongation along the X-axis.

Protection section 32 of resilient strip 12 extends approximately between a first aperture 34 and a second aperture 37. As shown in FIG. 6, when used with vehicle 24, protection section 32 faces outwardly from vehicle surface 26. Resilient strip 12 can also have a vehicle-abutting surface 39 (see FIG. 3) that opposes protection section 32. When vehicle protection assembly 10 is placed on vehicle 24, vehicle-abutting surface 39 can be brought into flush contact with vehicle surface 26.

When vehicle protection assembly 10 is installed on vehicle 24, raised section 36 operates to protect vehicle surface 26 from damaging contact (e.g. scratches, dents, or the like) with various kinds of foreign objects when the vehicle surface is moved (i.e. opened by a user or otherwise moved through space). As discussed, protection section 32 protects vehicle surface 26 from by foreign objects. Foreign objects can include, but are not limited to: doors of other vehicles, airborne debris, structural elements of a parking garage, bicycle handles, poles, and garage doors. These foreign objects will generally contact raised section 36, before they are able to contact base section 38, or vehicle surface 26. In this way, raised section 36 operates to shield vehicle surface 26 and to provide damage protection.

Figure 10:
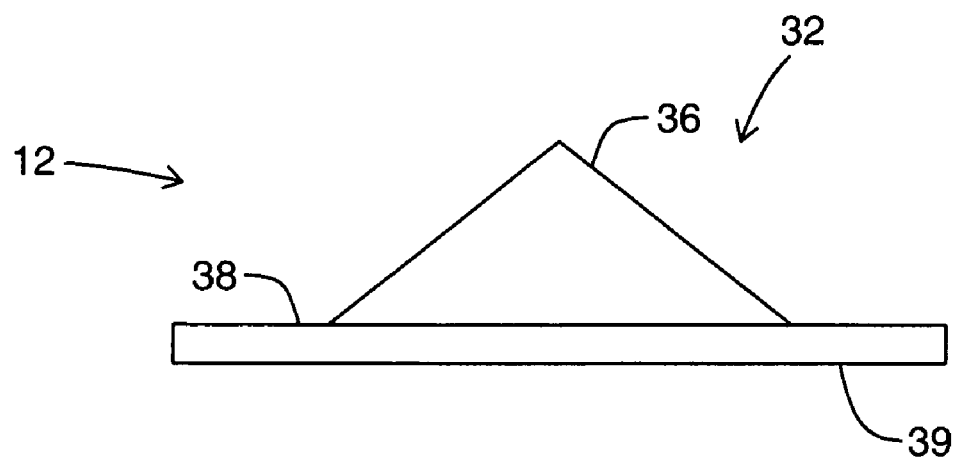
FIG. 10 is a sectional view of an another embodiment of the resilient strip of the vehicle protection assembly.
Figure 11:
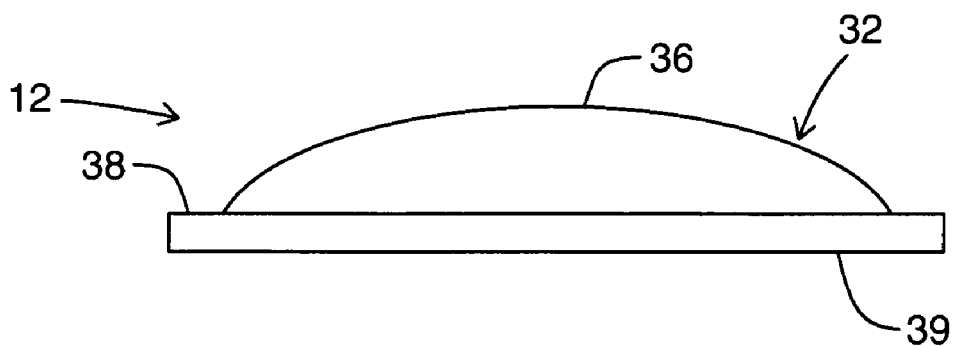
FIG. 11 is a sectional view of yet another embodiment of the resilient strip of the vehicle protection assembly.
Figure 12:
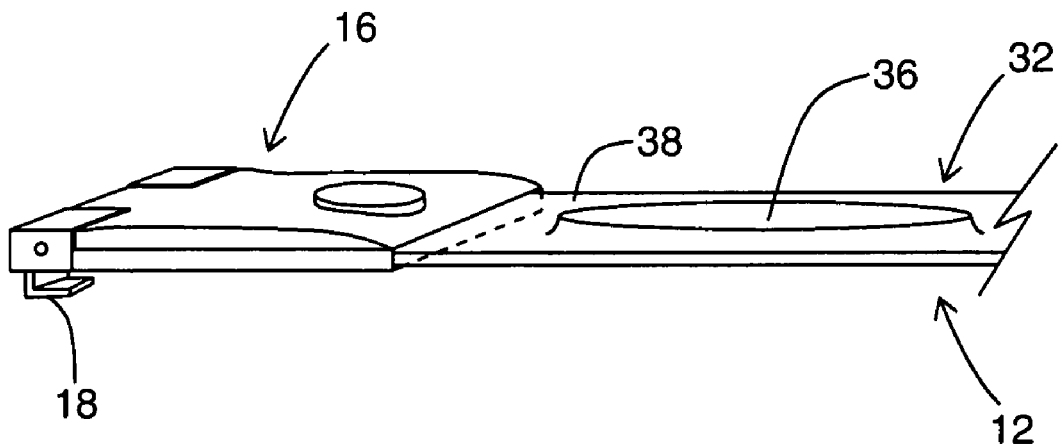
FIG. 12 is a partial side perspective view of another embodiment of the resilient strip of the vehicle protection assembly.

The cross-sectional dimensions of raised section 36 can vary in shape. For example, FIGS. 10, 11 and 12 illustrate a raised section 36 having a substantially triangular, circular and elliptical shape, respectively. Further, in another embodiment, the cross-sectional shape of raised section 36 (taken along the y-axis) may vary along the x-axis length of resilient strip 12 (not shown).

Figure 13:
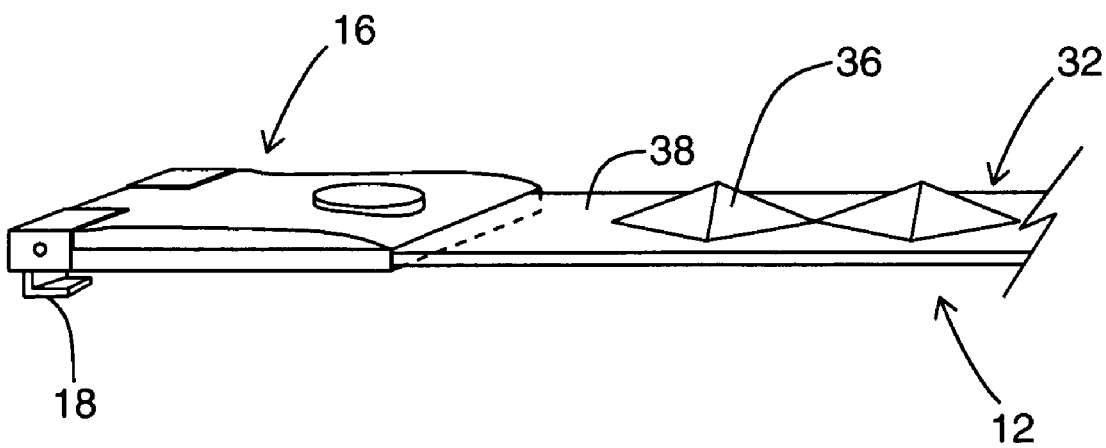
FIG. 13 is a partial side perspective view of another embodiment of the resilient strip of the vehicle protection assembly.

In other embodiments, as exemplified in FIGS. 12 and 13, protection section 32 can include a plurality of discrete raised sections 36. In one embodiment, these discrete raised sections 36 can be similar in shape to one another. In another embodiment, the shapes of these discrete raised sections 36 can be different from one another.

Further, protection section 32 can be formed of both raised section 36 and base section 38. Alternatively, protection section 32 can consist of only raised section 36, without a base section 38.

As discussed, protection section 32 protects vehicle surface 26 from being scratched, dented, or the like, by foreign objects. When protection section 32 comprises both raised section 36 and base section 38, raised section 36 serves to protect vehicle surface 26. Due to the protruding nature of raised section 36, foreign objects will contact raised section 36 before contacting base section 38 or vehicle surface 26. Since resilient strip 12 is made of a resilient material, most force impacts will be absorbed by the resilient strip 12, without the resilient strip 12, base section 38 or vehicle surface 26 undergoing any appreciable or permanent deformation.

Figure 14:
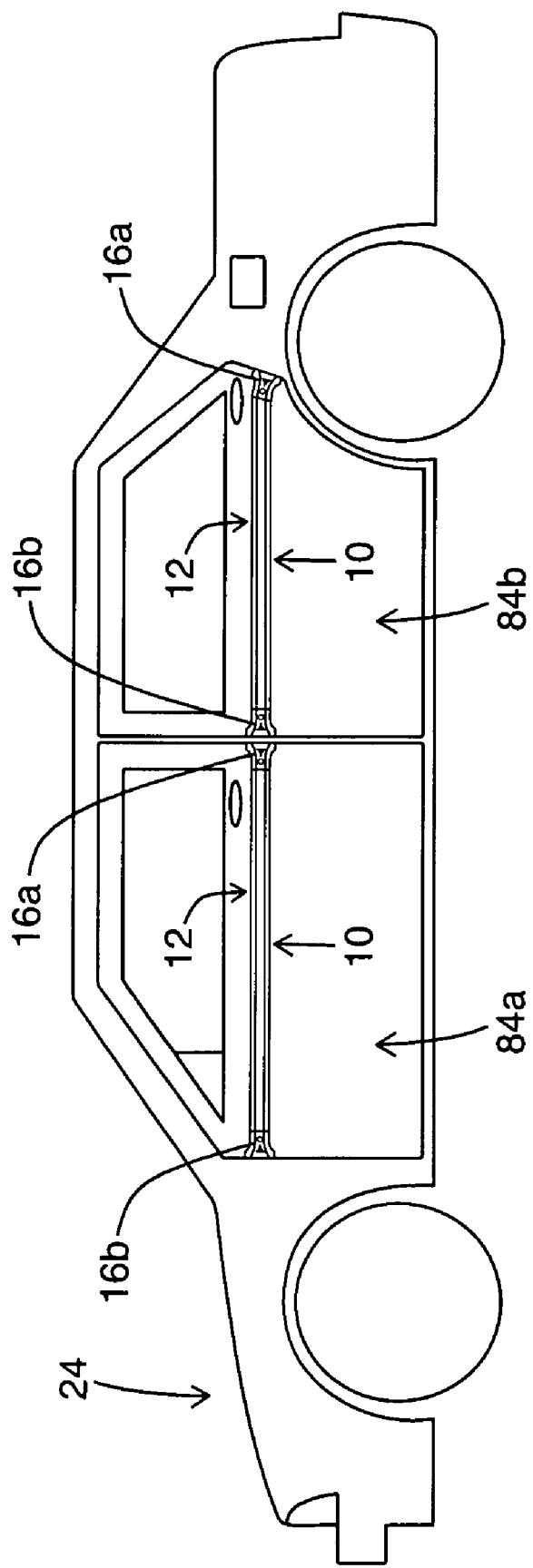
FIG. 14 is a side view illustrating two vehicle protection assemblies of FIG. 1, installed on the doors of a vehicle.

As discussed, FIG. 6 illustrates how vehicle protection assembly 10 can placed on vehicle 24 and can be used to protect door 84. However, vehicle protection assembly 10 can be placed anywhere on a vehicle between two vehicle edges. Further, FIG. 14 illustrates how vehicle protection assembly 10 can be used to protect two side vehicle doors, 84a and 84b. The use of two vehicle protection assemblies 10 in this fashion can be achieved without substantially interfering with the opening and closing of the vehicle doors 84a and 84b.

Figure 15:
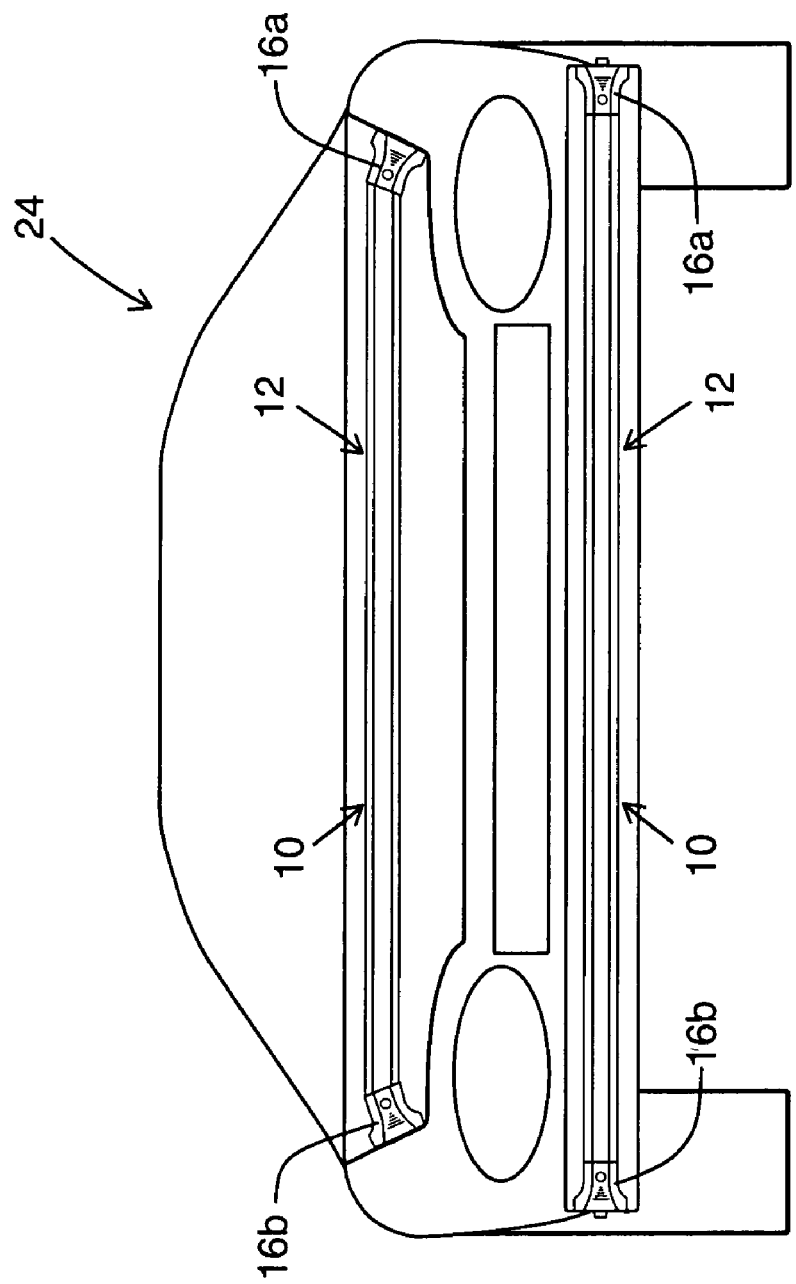
FIG. 15 is a front view of one vehicle protection assembly of FIG. 1 installed on the front bumper of a vehicle, and another installed on the hood of a vehicle.

FIG. 15 illustrates how two vehicle protection assemblies 10 can be used to protect a hood and a front bumper of vehicle 24. Again, vehicle protection assembly 10 does not substantially interfere with the opening and closing of the hood.

Figure 16:
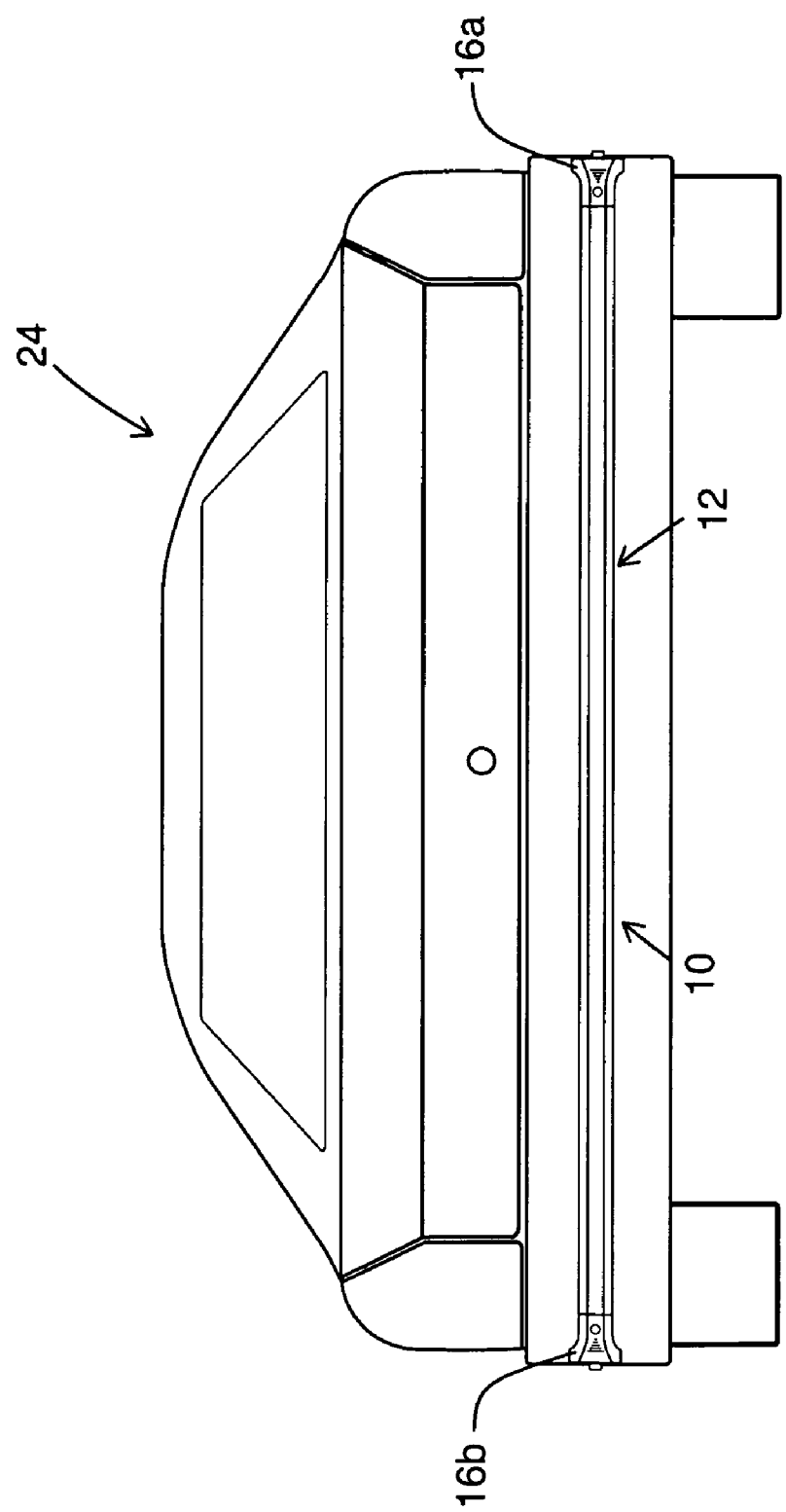
FIG. 16 is a rear view of the vehicle protection assembly of FIG. 1 installed on the rear bumper of a vehicle.

FIG. 16 illustrates how vehicle protection assembly 10 can be used to protect the rear bumper of vehicle 24. Finally, vehicle protection assembly 10 can also be used to protect the trunk of a vehicle (not shown). In this embodiment, vehicle protection assembly 10 does not substantially interfere with the opening and closing of the trunk.

Protection section 32 can include a decal layer. The decal layer can be any decorative design or text that alters the appearance of resilient strip 12. Such decorative designs and/or text can include, but are not limited to, advertising, logos, emblems, reflective, patterned or colored material. When vehicle protection strip 10 is used with a vehicle, the attachment of a decal can advantageously alter the appearance of the protection strip, and therefore, the vehicle to which the strip is attached. A user may wish to enhance the aesthetics of his/her vehicle in this manner. Alternatively, or in addition, a user may wish to generate additional revenue by placing an advertisement decal on his/her vehicle. The decal layer can be attached to protection section 32 by any attachment means known in the art. This attachment means includes, but is not limited to: inserting, screwing, gluing or molding the decal into protection section 32 of resilient strip 12. In one embodiment, intrusions can be placed within protection section 32 for receiving the decal layer.

Referring back to FIGS. 4, 5 and 17 to 25, the structure and operation of resilient clamping member 16 will now be discussed in detail. Throughout the following description, reference will be made to a resilient clamping member 16a (referred to as a resilient clamping member 16) positioned at one end 14 of resilient strip 12. It can be appreciated by those skilled in the art that when another resilient clamping member 16b is provided at second end 20 of resilient strip 12, the structure and functionality of the second resilient clamping member 16b is identical to that of resilient clamping member 16a. For brevity, a description of the resilient clamping member 16 positioned one end of the resilient strip 12 is discussed.

As discussed, resilient clamping member 16 includes an upper clamp 40 (FIGS. 17 to 20) and a lower clamp 42 (FIGS. 5, 21 to 23). Upper clamp 40 includes an upper protrusion 44 that extends outwardly in a direction away from lower clamp 42. Upper clamp 40 can also include grooves 46 (FIG. 17) for receiving lower clamp 42.

Lower clamp 42 can comprise clamp connection knobs 48 (FIG. 21) for engagement into grooves 46 of upper clamp 40. When engaged with one another, grooves 46 and knobs 48 create a pivot point at a first end 50 of first resilient clamping member 16 (FIG. 4). This pivot point allows upper clamp 40 and lower clamp 42 to move relative to one another, between an open and closed position.

When first resilient clamping member 16 is in the open position, upper clamp 40 and lower clamp 42 contact one another at the interface between grooves 46 and knobs 48 but are not aligned parallel to one another. When first resilient clamping member 16 is in the closed position, upper clamp 40 is brought into an orientation substantially parallel with lower clamp 42.

Figure 24:
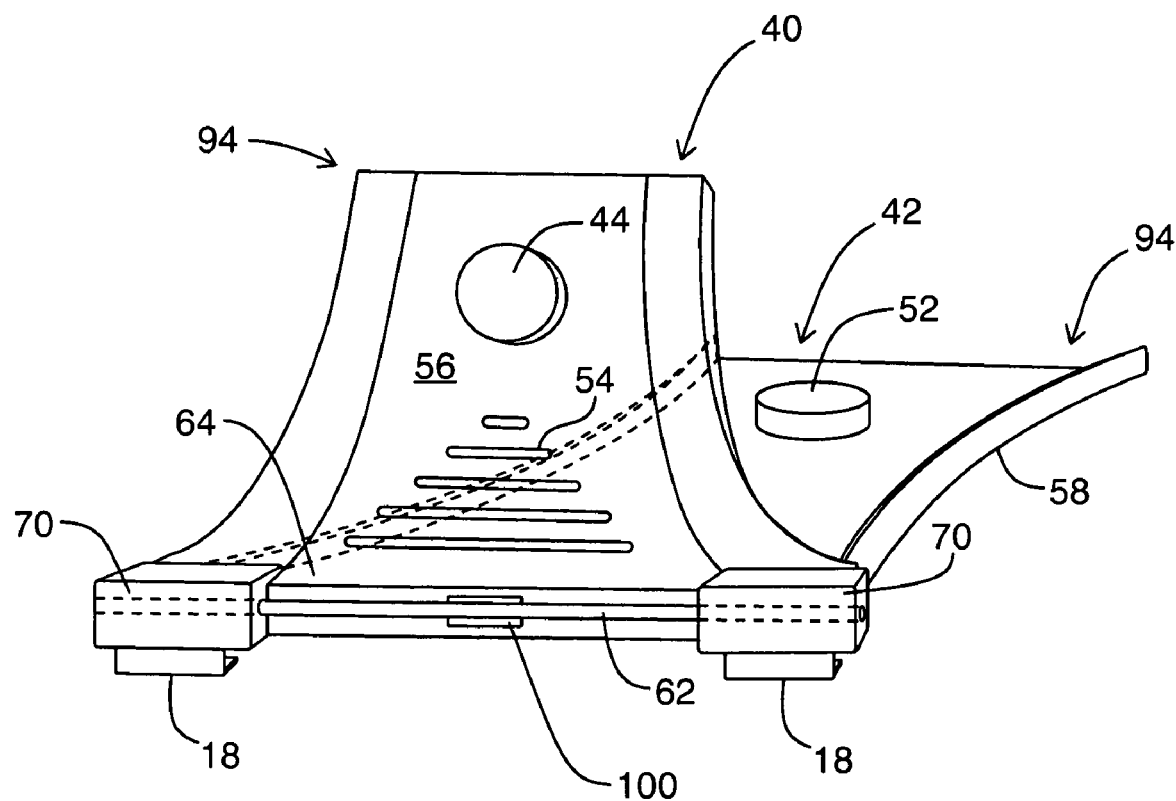
FIG. 24 is a top perspective view of an alternative embodiment of the resilient clamping member of the vehicle protection assembly.

Although in the embodiment described above a groove and knob connection is used to create a pivot point at first end 50, it can be appreciated by those skilled in the art there are many other known means of creating a pivot point about an interface. Alternatively, it is possible to use other mechanisms to couple upper and lower clamps 40 and 42 together, such as the use of a metal pole or insert that extends through the entire width of the upper and lower clamps 40 and 42. FIG. 24 illustrates an alternative embodiment for the pivotal connection between upper clamp 40 and lower clamp 42. In the illustrated embodiment, first end 50 of resilient member 16 comprises connection rod 62 extending through upper clamp flange 64 of upper clamp 40 and though arms 70 of lower clamp 42. The portion of connecting rod 62 passing though upper clamp flange 64 is illustrated with solid lines in FIG. 24. The portion of connecting rod 62 passing through lower clamp arms 70 is illustrated with a dashed line in FIG. 24. In the example embodiment, connection rod 62 provides a pivot axis about which upper clamp 40 can rotate relative to lower clamp 42.

Figure 17:
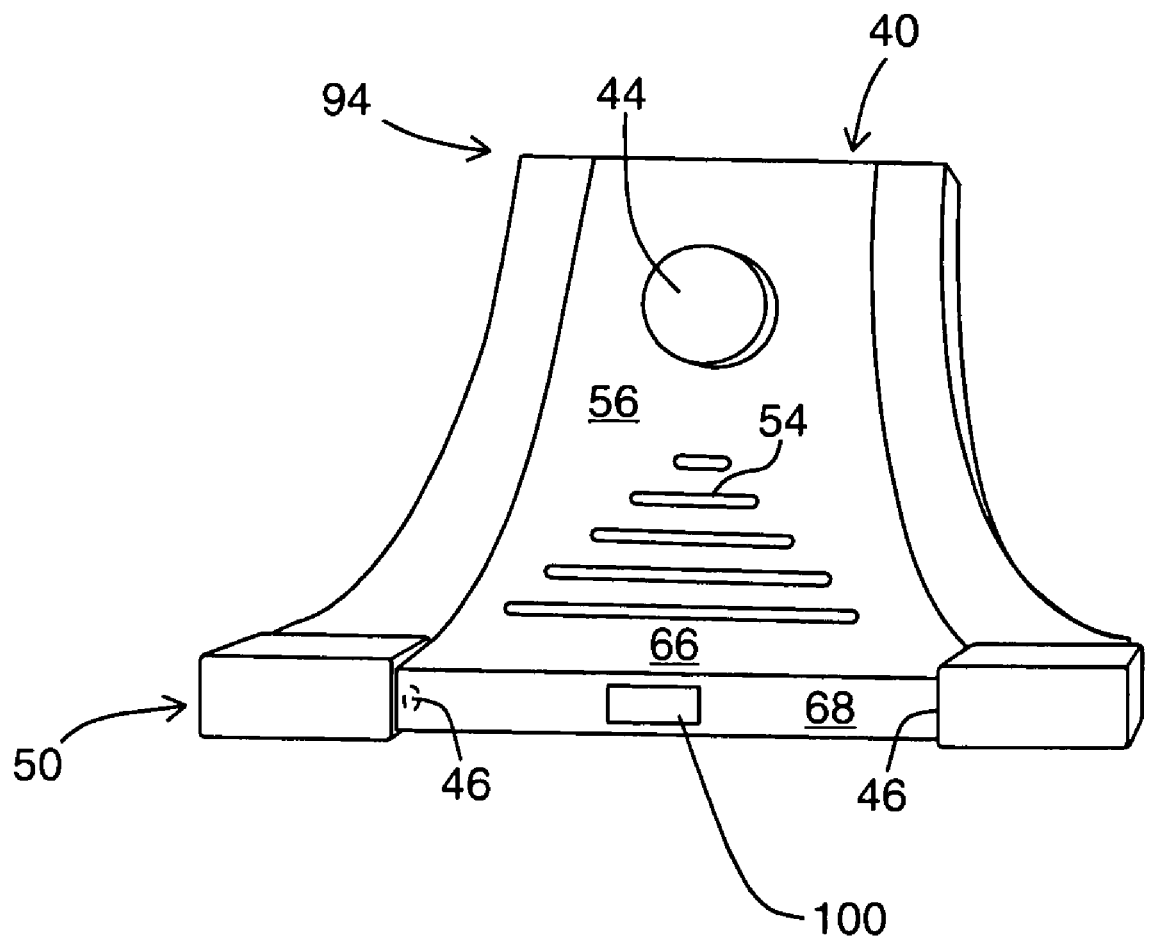
FIG. 17 is a top perspective view of the upper clamp of the resilient clamping member of FIG. 4.
Figure 18:
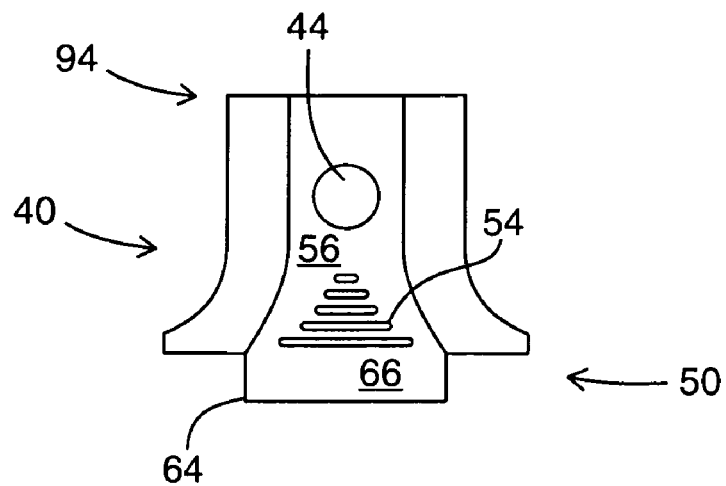
FIG. 18 is a top view of the upper clamp of the resilient clamping member of FIG. 4.
Figure 19:
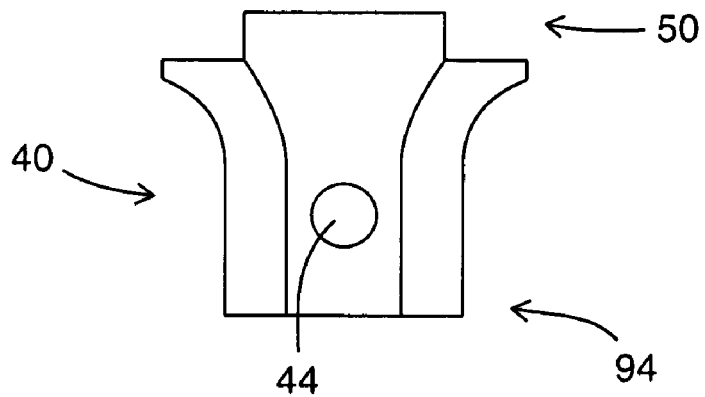
FIG. 19 is a bottom view of the upper clamp of the resilient clamping member of FIG. 4.
Figure 20:
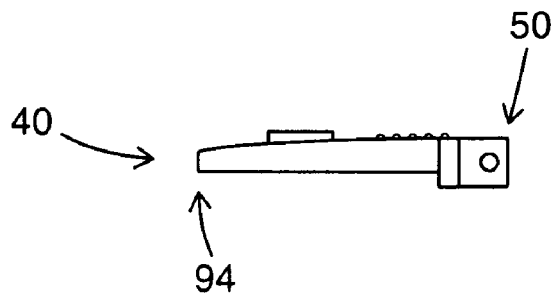
FIG. 20 is a side view of the upper clamp of the resilient clamping member of FIG. 4.
Figure 21:
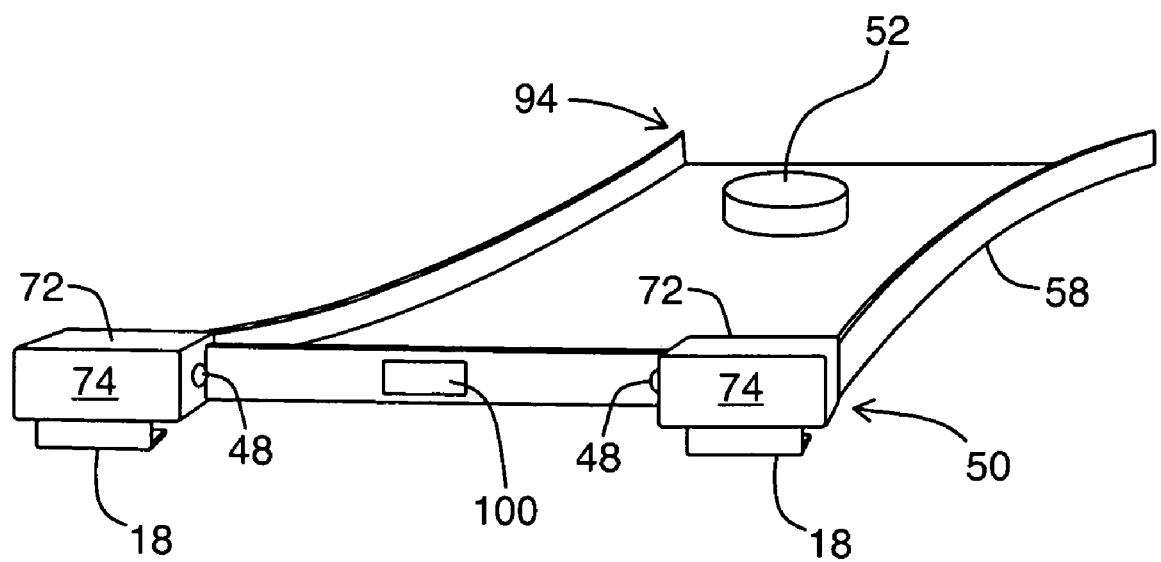
FIG. 21 is a top perspective view of the lower clamp of the resilient clamping member of FIG. 4.

Lower clamp 42 includes a lower protrusion 52 (FIG. 21). Lower protrusion 52 extends outwardly from lower clamp 42, in a direction towards upper clamp 40. Upper protrusion 44 defines a space within upper clamp 40 (FIG. 17). Lower protrusion 52 is preferably substantially the same size as, or slightly smaller than, the space created within upper protrusion 44. When first resilient clamp member 16 is in the closed position, the lower protrusion 52 is pushed into the space within the upper protrusion 44 and the lower protrusion 52 is brought into frictional contact with the inside surface of the upper protrusion 44, such that the upper protrusion 44 securely snaps onto lower protrusion 52. Therefore, in the closed position, the protrusion connection holds upper clamp 40 and lower clamp 42 together in an orientation substantially parallel to one another.

Alternatively, upper protrusion 44 can simply be an aperture for frictionally receiving lower protrusion 52.

In the illustrated embodiment, upper protrusion 44 and lower protrusion 52 are circular in shape. However, the protrusions can be of any shape, so long as sufficient friction is created between them so as to hold the two protrusions in contact with one another.

Upper protrusion 44 can be secured to lower protrusion 52 by forcing the upper clamp 40 towards lower clamp 42. Typically, a human hand can be used to exert the necessary force to bring the two clamps together. As shown in FIG. 17 gripping portion 54 can be placed on upper surface 56 of upper clamp 40. Gripping portion 54 can reduce slippage between a user's hand and upper clamp 40. Gripping portion 54 can comprise protrusions extending from upper surface 56 (in a direction away from lower clamp 42). In addition or alternatively, gripping portion 54 may be made of grip enhancing material, such as, but not limited to, rubber, silicone, plastic, etc.

Figure 25:
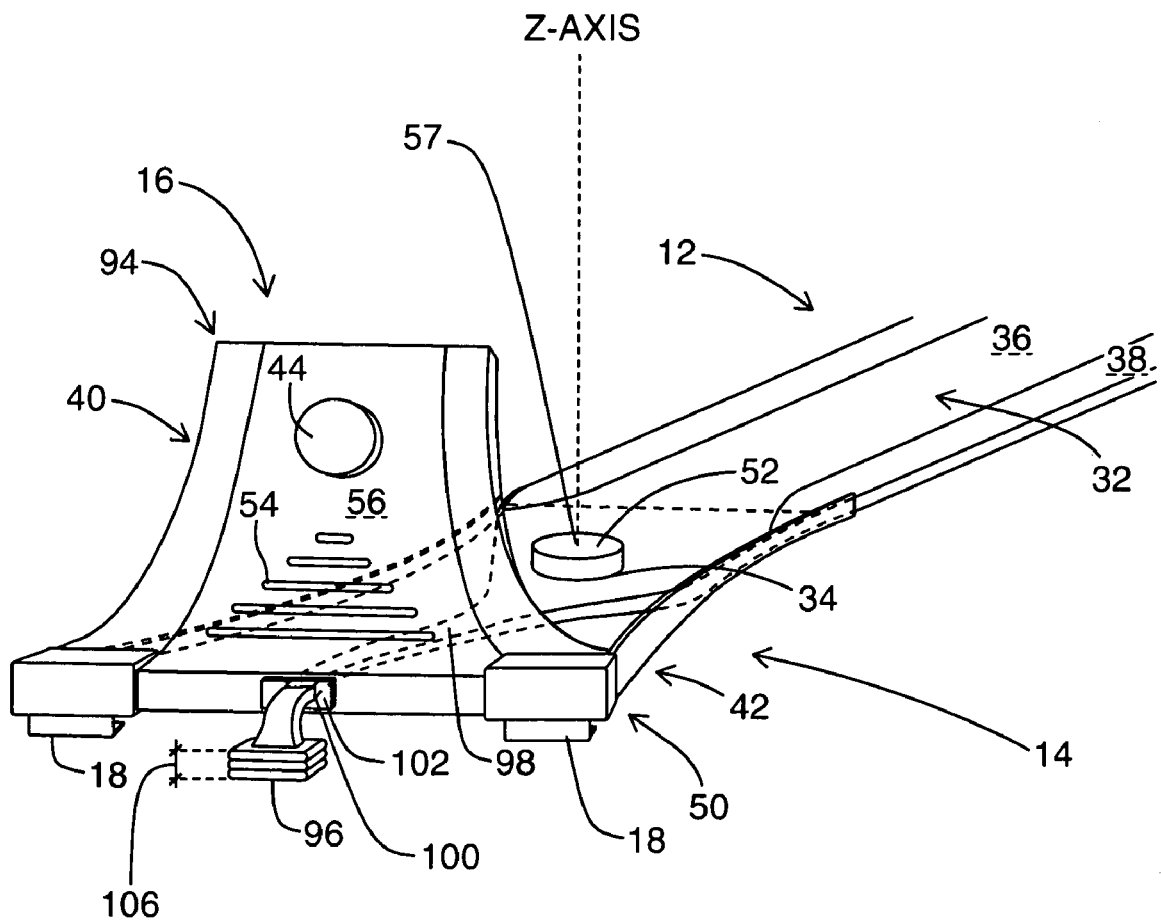
FIG. 25 is a side perspective view of the resilient clamping member of FIG. 4 engaged with the resilient strip member of FIG. 7.

As shown in FIG. 25, first end 14 of resilient strip 12 includes a first aperture 34. Aperture 34 is in communication with lower protrusion 52 of lower clamp 42. Preferably, aperture 34 is substantially the same size and shape as lower protrusion 52 and is shaped and sized to surround the lower protrusion 52. When first resilient clamping member 16 is in the closed position, first end 14 of resilient strip 12 is fixed between upper clamp 40 and lower clamp 42. This connection can be removably secured by snapping upper protrusion 44 onto lower protrusion 52.

In one embodiment, the connection between upper protrusion 44 and lower protrusion 52 creates a pivot point 57. When upper clamp 40 and lower clamp 42 are in the closed position, aperture 34 can surround the upper protrusion 44/lower protrusion 52 connection. The connection can serve as a pivot point 57 with the protrusion connection being able to rotate about the Z-axis. Pivot point 57 can rotate relative to aperture 34. Therefore, as first resilient clamping member 16 rotates about the Z-axis, first end 14 of resilient strip 12 can remain relatively stationary.

Figure 26:
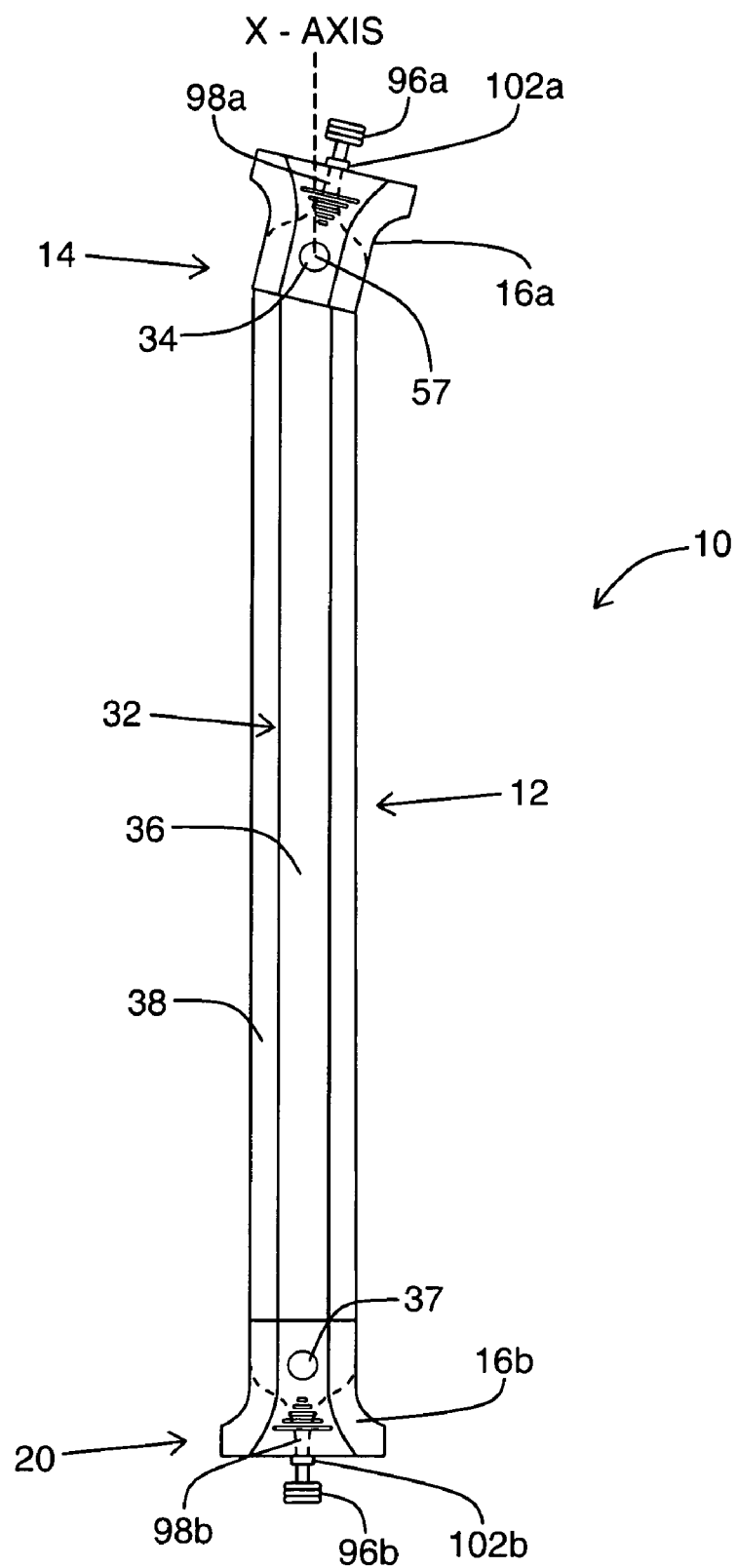
FIG. 26 is a front view of the vehicle protection assembly of FIG. 1 that illustrates the pivoting connection between the resilient clamping member of FIG. 4 and the resilient strip member of FIG. 7.

As shown in FIG. 26, resilient clamping member 16 is rotated relative to first end 14 of resilient strip 12. FIG. 26 shows the portion of resilient strip 12 that is located within clamping member 16 as a dashed line. The clamping member 16 can be rotated about pivot point 57. In one embodiment, first resilient clamping member 16 can rotate approximately 45 degrees in either direction from the X-axis. As previously described, when first resilient clamping member 16 is in the closed position, first end 14 of resilient strip 12 is secured between upper clamp 40 and lower clamp 42. Preferably, the frictional contact force exerted on first end 14 by the clamp members is small enough to not substantially inhibit the rotation of first resilient clamping member 16 relative to resilient strip 12.

Figure 27:
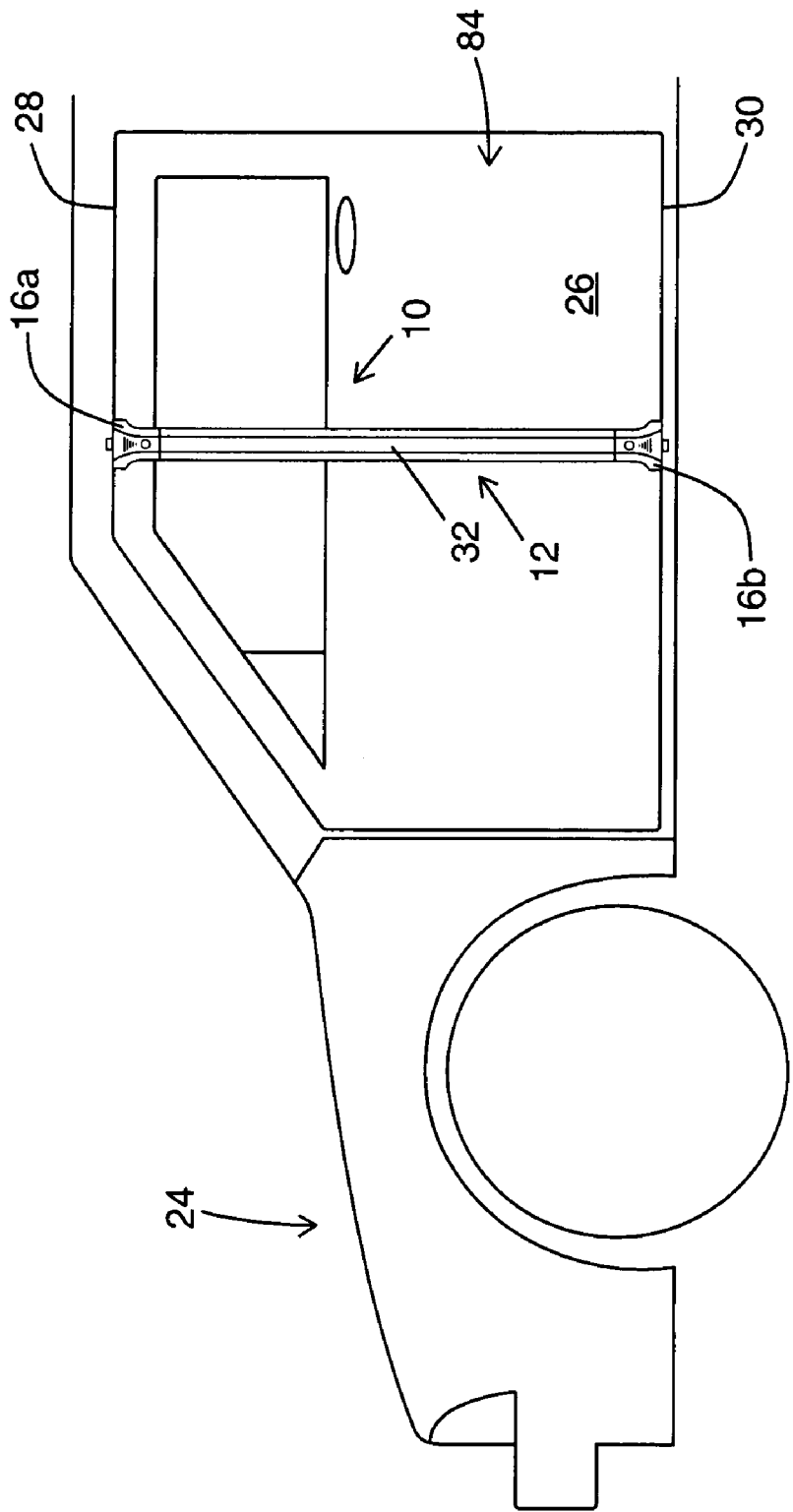
FIG. 27 is a side view of the vehicle protection assembly of FIG. 1 installed vertically on the door of a vehicle.

The rotation of resilient clamping member 16 relative to resilient strip 12 can have several advantages. As illustrated in FIG. 6, vehicle protection assembly 10 can be placed horizontally on vehicle 24. As illustrated in FIG. 27, vehicle protection assembly 10 can be placed vertically on vehicle 24. The rotation of resilient member 16 allows vehicle protection assembly to be oriented on vehicle 24 in a non-horizontal or a non-vertical orientation.

Figure 28:
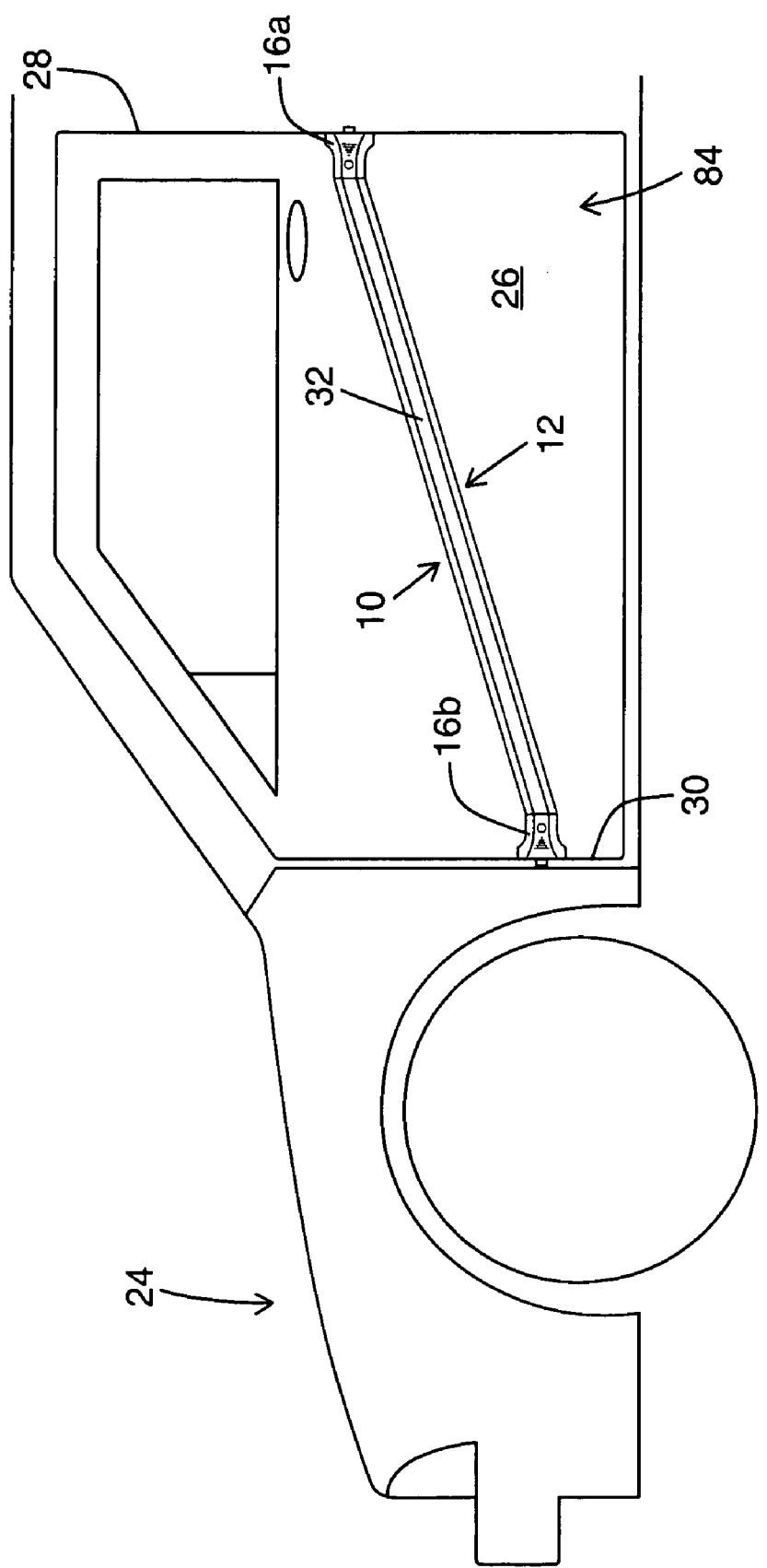
FIG. 28 is a side view of the vehicle protection assembly of FIG. 1 installed on the door of a vehicle at an angle between horizontal and vertical.

For example, as shown in FIG. 28, when vehicle protection assembly 10 is connected to two vertical edges 28 and 30 of a vehicle, resilient strip 12 can be held across the body of vehicle 24 in a non-horizontal orientation. Similarly, when vehicle protection assembly 10 is connected to two horizontal edges, resilient strip 12 can be held across the body of vehicle 24 in a non-vertical orientation. The ability to orient resilient strip 12 at an angle between horizontal and vertical may be desirable for some users.

Another advantage of the pivotal clamping member 16 can arise when vehicle protection strip 10 is used with at least one vehicle edge that is not horizontal or vertical. (see FIG. 14). The doors, trucks, bumpers and hoods of many modern day vehicles have uniquely shaped edges. Pivot point 57 can allow resilient strip 12 to be oriented horizontally across a vehicle even if at least one vehicle edge is not substantially vertical. Pivot point 57 can also allow vehicle protection assembly 10 to be oriented vertically across a vehicle even if at least one vehicle edge is not substantially horizontal.

Effectively, pivot point 57 can allow resilient strip 12 to be oriented vertically, horizontally, or at an orientation between horizontal and vertical, irrespective of the shape of vehicle edges to which the vehicle protection assembly 10 is attached.

Preferably, first resilient clamping member 16 can be entirely made of a resilient material, such as but not limited to rubber. In another embodiment, resilient clamping member 16 can be metal that is rubberized, coated, or bonded with rubber. Like resilient strip 12, first resilient clamping member 16 can absorb and withstand force impacts, typically absorbing a large portion of the impact force while still undergoing minimal permanent deformation. Due to the resilience of first resilient clamping member 16, in many cases, if a foreign object impacts first resilient clamping member 16, the vehicle will not be affected.

Referring back to FIG. 18, first end 50 of upper clamp 40 can include a flange 64 that extends outwardly from upper clamp 40. As shown in FIG. 17, flange 64 can include a first upper clamp face 66 that is substantially orthogonal to a second upper clamp face 68.

Figure 22:
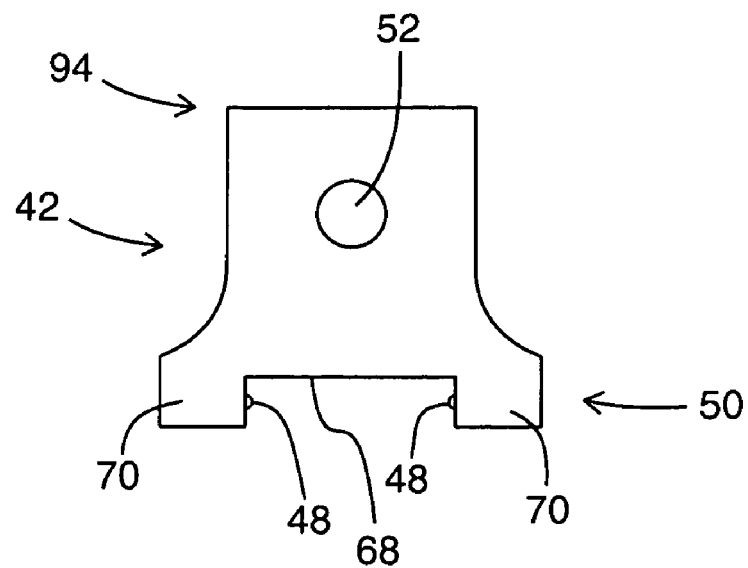
FIG. 22 is a top view of the lower clamp of the resilient clamping member of FIG. 4.
Figure 23:
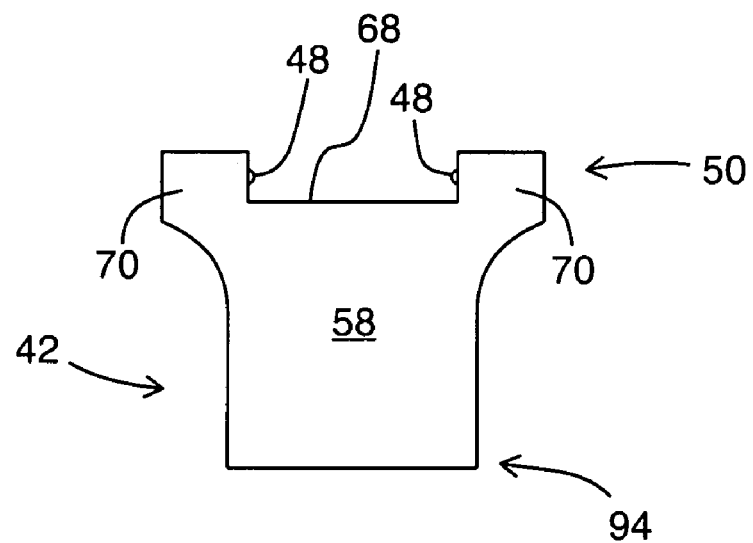
FIG. 23 is a bottom view of the lower clamp of the resilient clamping member of FIG. 4.

Referring to FIG. 22, first end 50 of lower clamp 40 can include a clevis 68. Clevis 68 can be defined by two extension arms 70. Each extension arm 70 can have a first lower clamp face 72 that can be substantially orthogonal to a second lower clamp face 74 (see FIG. 21).

Figure 29:
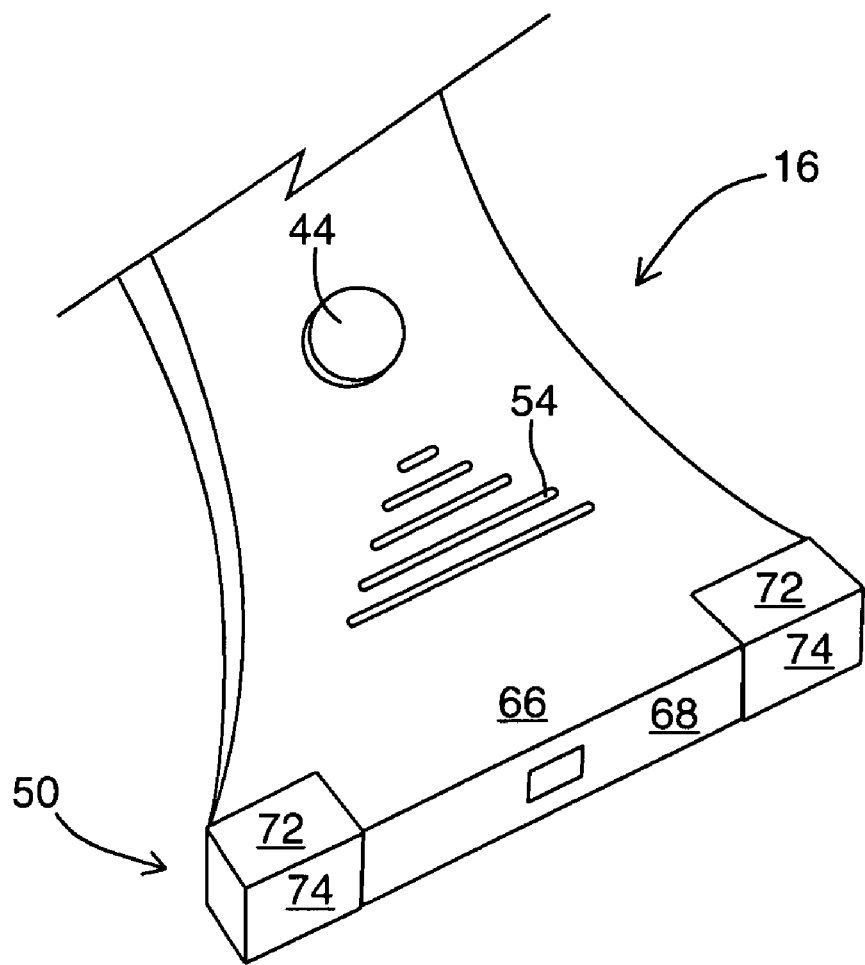
FIG. 29 is a top perspective view of the resilient member of FIG. 4 in the closed position.

As shown in FIG. 29, when upper clamp 40 and lower clamp 42 are in the closed position, first upper clamp face 66 and first lower clamp faces 72 can be become flush with one another.

As also shown in FIG. 29, when upper clamp 40 and lower clamp 42 are in the closed position, second upper clamp face 68 and second lower clamp faces 74 can also become flush with one another.

Figure 30:
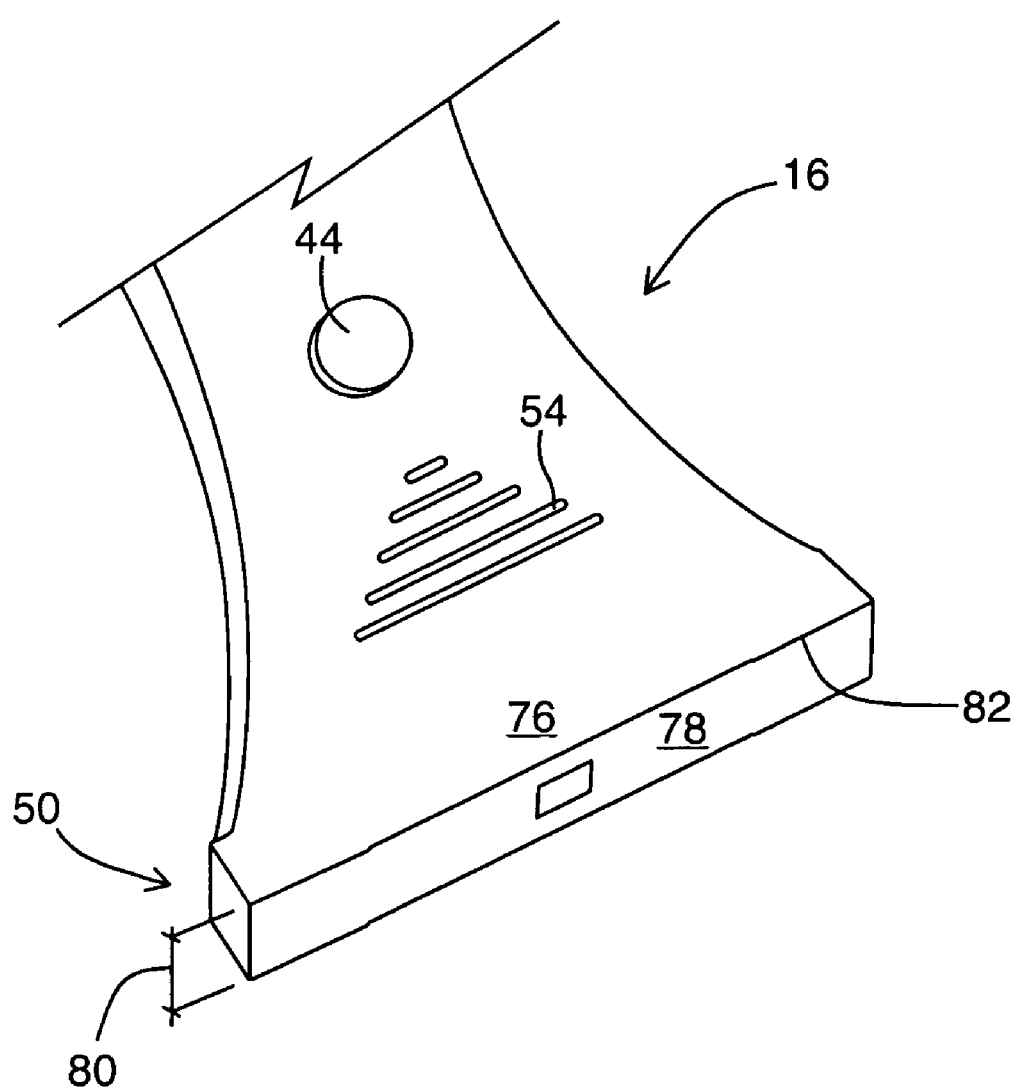
FIG. 30 is a top perspective view of the resilient member of FIG. 4 with simplified labeling.

FIG. 30 provides a simplified perspective view of a resilient clamping member 16 where first faces 66 and 72 (FIG. 29) together form a first protection region 76. Second faces 68 and 74 (FIG. 29) together form a second protection region 78. Second protection region 78 can have a depth dimension 80. Preferably, the depth dimension 80 is in the approximate range of 10 mm to 30 mm. By having a sufficient depth dimension, the likelihood of a foreign object impacting resilient member 16 instead of first vehicle edge 28 is increased. Furthermore, sufficient thickness of resilient member 16 allows the impact of a foreign object to, in most cases, be substantially absorbed by resilient clamping member 16, thereby minimizing the force transferred to vehicle 24. The thickness of resilient clamping member 16 reduces the likelihood that first vehicle edge 28 will be scratched, dented, etc. by a foreign object.

As will be appreciated by those skilled in the art, the resilient clamping member 16 of the embodiment of FIG. 1 can also protect a second vehicle edge 30 in a similar manner to first vehicle edge 28. First protection region 76 meets second protection region 78 at protection edge 82. The two protection regions are typically substantially orthogonal to one another and accordingly compatible in such a configuration.

Figure 31:
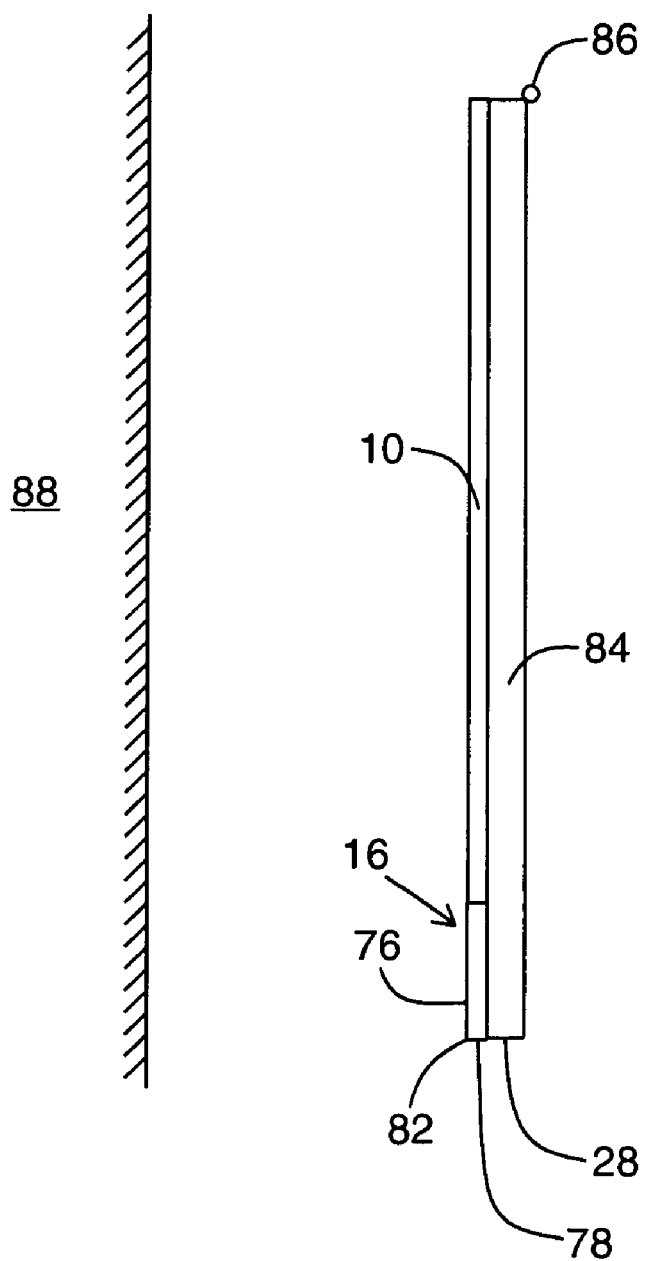
FIG. 31 is a top view of an alternative embodiment of the vehicle protection assembly installed on a vehicle door located in the closed position.

FIG. 31 illustrates a top view of vehicle protection assembly 10 placed on a door 84 of a vehicle. In the illustrated embodiment, resilient clamping member 16 is attached to first vehicle edge 28 of vehicle door 84. First vehicle edge 28 can be located at the door edge opposite door hinge 86. In the illustrated embodiment, door 84 is in the closed position, safely away from foreign object 88. Foreign object 88 can include, but is not limited to: doors of other vehicles, airborne debris, structural elements of a parking garage, bicycle handles, poles, and garage doors.

Figure 32:
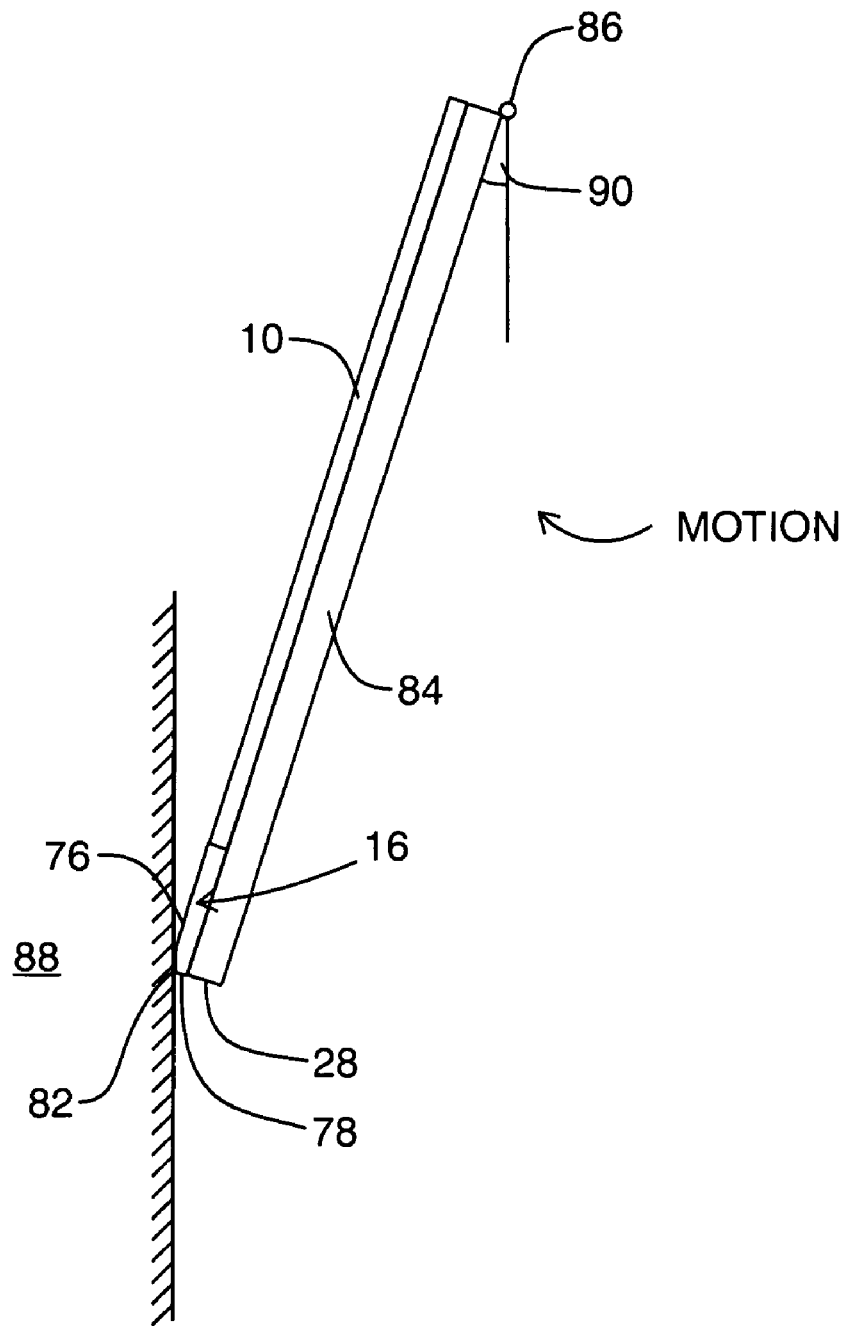
FIG. 32 is a top view of an alternative embodiment of the vehicle protection assembly installed on a vehicle door that is opened at a relatively small angle.

FIG. 32 illustrates a top view of vehicle assembly 10 placed on door 84 of a vehicle, which is opened at a relatively small door angle 90. In the illustrated circumstance, first vehicle edge 28 can be protected from a foreign object primarily by first protection region 76 and protection edge 82. Since foreign object 88 can impact these regions as opposed to door 84, first vehicle edge 28 is protected from the scratches, dents, or the like, that could be caused by foreign object 88.

Figure 33:
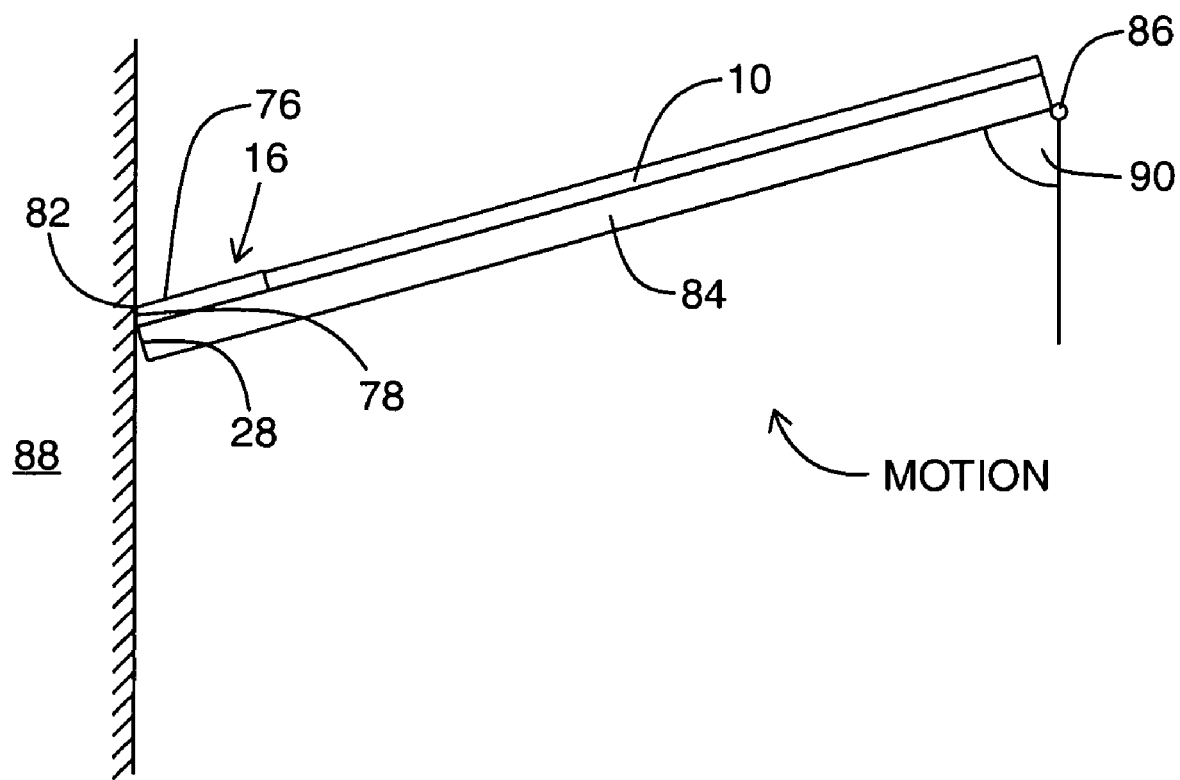
FIG. 33 is a top view of an alternative vehicle protection assembly installed on a vehicle door opened at a relatively large angle.

FIG. 33 illustrates a top view of vehicle assembly 10 placed on door 84 of a vehicle, which is opened at a relatively large door angle 90. In the illustrated circumstance, first vehicle edge 28 can be protected from foreign object 88 primarily by protection edge 82 and second protection region 78. Since foreign object 88 can impact these regions as opposed to door 84, first vehicle edge 28 is protected from the scratches, dents, or the like, that could be caused by foreign object 88.

Referring back to FIG. 5, clamp hook element 18 is preferably recessed back from first end 50 of resilient member 16. As previously discussed, this small recess gap is illustrated as recess offset 92. Due to recess offset 92, in the preferred embodiment, first resilient clamping member 16 extends slightly past first vehicle edge 28 when vehicle protection apparatus 10 is mounted on a vehicle.

Figure 34:
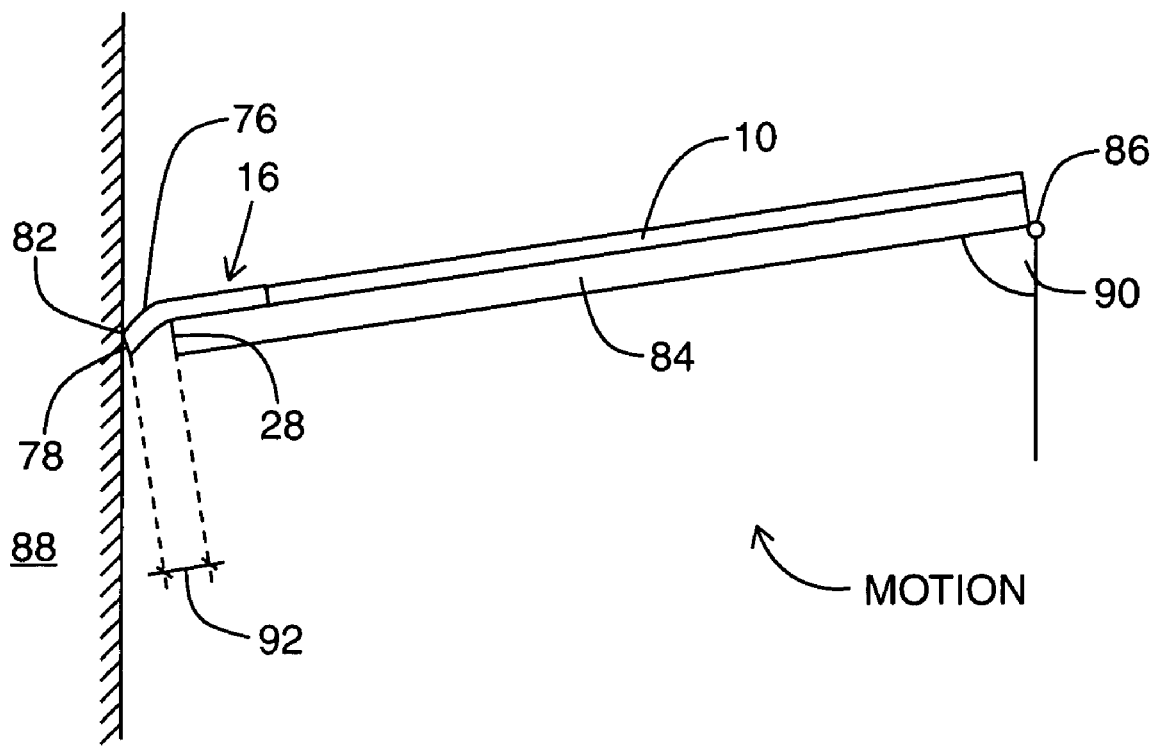
FIG. 34 is a top view of vehicle protection assembly of FIG. 1 placed on a vehicle door opened at a relatively large angle.

FIG. 34 illustrates a top view of vehicle assembly 10 installed on the door 84 of a vehicle, which is opened at a relatively large door angle 90. The illustrated embodiment comprises a resilient member 16 that includes the embodiment of lower clamp 44 illustrated in FIG. 5. In this particular embodiment, hook element 18 is recessed back from first end 50 of first resilient member 16. As a result, resilient clamping member 16 extends past first vehicle edge 28 by a dimension substantially equal to recess offset 92. Since resilient member 16 can extend beyond first vehicle edge 28, the likelihood of foreign object 88 coming into contact with resilient member 16 before first vehicle edge 28 is increased. Furthermore, as resilient member 16 comes into contact with foreign object 88, resilient member 16 can wrap around first vehicle edge 28 (as shown in FIG. 34). This wrapping action can further protect first vehicle edge 28 from foreign object 88. This wrapping motion can be most useful when door 84 is opened at a relatively large angle 90, because when door 84 is opened in such a manner, a large surface area of first vehicle edge 28 is exposed to foreign object 88 and is susceptible to potential damage.

Vehicle protection assembly 10 has the advantage of simultaneously protecting vehicle surface 26 and first vehicle edge 28. As previously discussed, resilient strip 12 can protect vehicle surface 26 from impact damage. Further, first protection region 76, second protection region 78 or protection edge 82 (or a combination thereof) can protect first vehicle edge 28. This particular embodiment has the advantage of protecting a portion of both vehicle surface 26 and first vehicle edge 28 simultaneously, without having to adjust vehicle protection assembly 10 between a surface protection and edge protection mode.

Although vehicle protection assembly 10 can be used to protect a car door, it can also be used to simultaneously protect a portion of the surface and edges of a bumper, hood, or trunk.

In another embodiment, second end 20 of resilient member 12 includes second resilient clamping member 16*b*. In this particular embodiment, portions of both first vehicle edge 28 and second vehicle edge 30 can be protected.

Referring back to the embodiment illustrated in FIG. 1, in the illustrated embodiment, resilient strip 12 is coupled to first resilient clamping member 16*a* at the first end 14 of resilient strip 12. As previously discussed, first resilient clamping member 16*a* is hinged about its first end 50. As shown in FIG. 25, second end 94 can be located opposite to first end 42, and second end 94 of resilient clamping member 16 can be opened to receive first end 14 of resilient strip 12.

Referring back to FIG. 7, resilient strip 12 can include two compression flange members 96*a* and 96*b*. Alternatively, a compression flange member 96 can be formed at only one end of resilient strip 12. In one embodiment, compression flange 96 is continuously connected to the remainder of resilient strip 12 by transition portion 98. As shown in FIG. 25, transition portion 98 passes through corresponding apertures 100 in upper clamp 40 and lower clamp 42. Stopper 102 can surround transition portion 98 and can be placed on the compression flange side of first resilient member 16. Stopper 102 physically prevents compression flange 96 from being pulled towards first resilient member 16 when resilient strip 12 is extended and a tensile force is created within resilient strip 12.

Compression flange member 96 is made of a resilient yet compressible material, such as, but not limited to, rubber, silicone, plastic etc. Compression flange member 96 can be placed between a first vehicle edge 28 and another edge component within a vehicle, such as, but not limited to, fenders and door frames.

As shown in FIG. 6, compression flange member 96 is positioned between second vehicle edge 30 and fender edge 104 of vehicle 24. Preferably, the thickness dimension 106 of compression flange member 96 (see FIG. 25) is slightly larger than the gap 108 between second vehicle edge 30 and fender edge 104 (see FIG. 6). In the illustrated embodiment, when vehicle door 84 is opened, compression flange member 96 can be placed within gap 108. Once the car door is closed, compression flange can be compressed and locked in place by gap 108. Due to the compression force exerted on compression flange member 96 by first vehicle edge 28 and fender edge 104, an individual would not easily be able to remove compression flange 96. Since compression flange 96 is connected to resilient strip 12 by transition portion 98, an individual would not likely be able to remove vehicle protection assembly 10 without opening car door 84. This feature can be advantageous to prevent theft of vehicle protection assembly 10 from vehicle 24.

The present invention protects a portion of an edge of a vehicle component while simultaneously protecting a portion of the surface of a vehicle component, such as a door, hood, bumper, trunk or the like. A unique resilient clamping member can be placed at at least one end of the present invention. This resilient clamping member can provide an enhanced level of protection for a vehicle edge component. As compared to the prior art, the present invention provides a lower risk that the edge of a vehicle component will be scratched or dented when it is moved towards a foreign object or when a foreign object is moved towards the edge.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A removable vehicle protection assembly for installation between first and second edges of a vehicle, said removable vehicle protection assembly comprising:
   (a) a resilient strip portion extendible along its longitudinal axis for protecting the surface of the vehicle;
   (b) a first resilient clamping member for protecting a portion of the first vehicle edge and for securely receiving one end of the resilient strip portion and having a first clamp hook element for engaging a portion of the first vehicle edge; and
   (c) a second hook element coupled to the other end of the resilient strip portion, said second hook element for engaging a portion of the second vehicle edge.

2. The removable vehicle protection assembly of claim 1, further comprising a second resilient clamping member fixedly coupled to the second hook element, said second resilient clamping member for securely receiving the other end of the resilient strip portion.

3. The removable vehicle protection assembly of claim 1, wherein the first clamp hook element is coupled to the resilient clamping member at the opposite end to where the resilient clamping member receives the resilient strip portion, and where the first clamp hook element is recessed back from the opposite end of the resilient clamping member such that the first resilient clamping member extends past the first vehicle edge when the vehicle protection apparatus is installed on the first and second vehicle edges.

4. The removable vehicle protection assembly of claim 1, wherein said one end of the resilient strip portion is pivotally connected to the first resilient clamping member.

5. The removable vehicle protection assembly of claim 1, wherein said first resilient clamping member includes an upper clamp element and a lower clamp element such that the resilient strip portion is pivotally connected to the first resilient clamping member along a pivoting axis defined by a point of connection between the upper and lower clamp elements of said resilient clamping member.

6. The removable vehicle protection assembly of claim 1, wherein the resilient strip portion includes a base section and a raised section and wherein the raised section has a lateral cross-section, taken orthogonal to the bottom surface of the resilient strip portion and to the longitudinal axis of the resilient strip portion, that is selected from the group consisting of: square, triangle, circular, elliptical.

7. The removable vehicle protection assembly of claim 1, wherein the resilient strip portion has a vehicle-abutting surface opposing a protection surface, said protection surface including at least one protrusion extending from the protection surface in a direction away from the vehicle-abutting surface.

8. The removable vehicle protection assembly of claim 7, wherein at least one of the protrusions has a cross-section taken along the surface of the resilient strip portion that is selected from the group consisting of: square, triangle, circular, elliptical.

9. The removable vehicle protection assembly of claim 1, wherein said first resilient clamping member includes an upper clamp and a lower clamp, said upper clamp being hinged to said lower clamp at one end such that the resilient strip portion is received at the opposing end.

10. The removable vehicle protection assembly of claim 9, wherein the resilient strip portion has an aperture and wherein the lower clamp has a corresponding protrusion that is in communication with the aperture of the one end of the resilient strip portion and a corresponding protrusion on the upper clamp.

11. The removable vehicle protection assembly of claim 9, wherein the upper clamp includes a gripping portion for forcing the upper clamp and the lower clamp to secure the one end of the resilient strip portion therein.

12. The removable vehicle protection assembly of claim 1, wherein the resilient strip portion includes a stopper and a compression flange member at at least one end, such that the first resilient clamping member engages the stopper and allows the compression flange member to extend therefrom for engagement between vehicle edges.

13. The removable vehicle protection assembly of claim 1, wherein when the resilient strip is in a non-extended position, the length in the direction of the longitudinal axis is in the approximate range of 2 feet to 8 feet, and the width in the direction substantially orthogonal to the length dimension is in the approximate range of 1 inch to 6 inches.

14. The removable vehicle protection assembly of claim 1, wherein the resilient strip portion has a vehicle-abutting surface opposing a protection surface, wherein at least one decal layer is affixed on the protection surface of the resilient strip.

15. The removable vehicle protection assembly of claim 12, where the decal layer includes a decorative element selected from the group consisting of: graphic design, advertising, logos, emblems, reflective, patterned or colored material.

* * * * *